(12) United States Patent
Mushtaq et al.

(10) Patent No.: US 8,059,652 B2
(45) Date of Patent: Nov. 15, 2011

(54) METHOD AND APPARATUS FOR DETECTING SUPPORT FOR A PROTOCOL DEFINING SUPPLEMENTAL HEADERS

(75) Inventors: Faisal Mushtaq, Santa Clara, CA (US); Sitaram Dontn, Sunnyvale, CA (US); Shreeram Bhide, San Jose, CA (US); Ali Golshan, Palo Alto, CA (US); Michael R. Smith, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 12/183,347

(22) Filed: Jul. 31, 2008

(65) Prior Publication Data

US 2009/0086641 A1    Apr. 2, 2009

Related U.S. Application Data

(63) Continuation of application No. 10/881,074, filed on Jun. 30, 2004, now Pat. No. 7,436,836.

(51) Int. Cl.
*H04L 12/56* (2006.01)
(52) U.S. Cl. ........................................ 370/392
(58) Field of Classification Search .................. None
See application file for complete search history.

(56) References Cited

U.S. PATENT DOCUMENTS

| 4,387,371 A | 6/1983 | Beker et al. ............... 340/825.52 |
| 5,058,110 A | 10/1991 | Beach et al. .................. 370/464 |
| 5,371,852 A | 12/1994 | Attanasio et al. ............. 709/245 |
| 5,473,599 A | 12/1995 | Li et al. ............................ 370/16 |
| 5,680,589 A | 10/1997 | Klingman ...................... 370/901 |
| 5,822,512 A | 10/1998 | Goodrm et al. ........... 395/182.11 |
| 5,825,772 A | 10/1998 | Dobbins et al. ............... 370/396 |
| 5,872,783 A | 2/1999 | Chin ........................ 370/395.32 |
| 5,959,968 A | 9/1999 | Chin et al. .................... 370/216 |
| 5,959,972 A | 9/1999 | Hamami ....................... 370/228 |
| 5,959,989 A | 9/1999 | Gleeson et al. ................ 370/390 |
| 5,978,852 A | 11/1999 | Myrick et al. ................ 709/238 |
| 6,032,194 A | 2/2000 | Gai et al. ...................... 709/239 |
| 6,064,671 A | 5/2000 | Killian .......................... 370/389 |
| 6,085,238 A | 7/2000 | Yuasa et al. ................... 709/223 |
| 6,108,300 A | 8/2000 | Coile et al. .................... 370/217 |

(Continued)

FOREIGN PATENT DOCUMENTS

CN     1407762 A     4/2003

(Continued)

OTHER PUBLICATIONS

Knight, S. et al. Virtual Router Redundancy Protocol, IETF, Apr. 1998, 27 pages.

(Continued)

*Primary Examiner* — Raj Jain
(74) *Attorney, Agent, or Firm* — Campbell Stephenson LLP

(57) ABSTRACT

Various methods and systems for detecting whether a network device supports a protocol, which defines a supplemental header, are disclosed. One method involves detecting a value within a preamble generated by a sending device and verifying that a header format of a header, also generated by the sending device, conforms to a header format definition of a protocol. The header format definition of the protocol defines a supplemental header. The preamble can be an Ethernet preamble. In one embodiment, the preamble is a converged data link (CDL) preamble or other type of preamble that is used to convey operation, administration and management (OAM) information.

29 Claims, 8 Drawing Sheets

U.S. PATENT DOCUMENTS

| | | | | |
|---|---|---|---|---|
| 6,163,543 A | 12/2000 | Chin et al. | | 370/400 |
| 6,181,681 B1 | 1/2001 | Hiscock et al. | | 370/279 |
| 6,181,699 B1 | 1/2001 | Crinion et al. | | 370/392 |
| 6,195,351 B1 | 2/2001 | Hiscock et al. | | 370/389 |
| 6,202,114 B1 | 3/2001 | Dutt et al. | | 710/311 |
| 6,222,820 B1 | 4/2001 | Hamami | | 370/218 |
| 6,229,787 B1 | 5/2001 | Byrne | | 370/218 |
| 6,236,659 B1 | 5/2001 | Pascoe | | 370/404 |
| 6,243,360 B1 | 6/2001 | Basilico | | 370/231 |
| 6,275,953 B1 | 8/2001 | Vahalia et al. | | |
| 6,298,061 B1 | 10/2001 | Chin et al. | | 370/400 |
| 6,377,992 B1 | 4/2002 | Fernandez et al. | | |
| 6,388,995 B1 | 5/2002 | Gai et al. | | 370/256 |
| 6,421,787 B1 | 7/2002 | Slaughter et al. | | 714/4 |
| 6,460,088 B1 | 10/2002 | Merchant | | 709/236 |
| 6,487,591 B1 | 11/2002 | Budhraja et al. | | 709/223 |
| 6,519,231 B1 | 2/2003 | Ding et al. | | 370/256 |
| 6,535,490 B1 | 3/2003 | Jain | | 370/256 |
| 6,535,491 B2 | 3/2003 | Gai et al. | | 370/256 |
| 6,567,403 B1 | 5/2003 | Congdon et al. | | 370/389 |
| 6,570,845 B1 | 5/2003 | Blanc et al. | | 370/218 |
| 6,657,973 B1 | 12/2003 | Arima | | 370/254 |
| 6,658,016 B1 | 12/2003 | Dai et al. | | 370/424 |
| 6,674,713 B1 | 1/2004 | Berg et al. | | 370/217 |
| 6,678,241 B1 | 1/2004 | Gai et al. | | 370/216 |
| 6,687,758 B2 | 2/2004 | Craft | | 709/230 |
| 6,690,668 B1 | 2/2004 | Szczepanek et al. | | 370/392 |
| 6,697,339 B1 | 2/2004 | Jain | | 370/256 |
| 6,728,780 B1 | 4/2004 | Hebert | | 709/239 |
| 6,735,198 B1 | 5/2004 | Edsall et al. | | 370/389 |
| 6,735,205 B1 | 5/2004 | Mankude et al. | | 370/395.32 |
| 6,738,345 B1 | 5/2004 | Williamson | | 370/217 |
| 6,760,776 B1 | 7/2004 | Gallo et al. | | 709/238 |
| 6,804,721 B2 | 10/2004 | Wils et al. | | 709/230 |
| 6,810,421 B1 | 10/2004 | Ishizaki et al. | | 709/226 |
| 6,816,467 B1 | 11/2004 | Muller et al. | | 370/256 |
| 6,856,591 B1 | 2/2005 | Ma et al. | | 370/216 |
| 6,915,340 B2 | 7/2005 | Tanaka | | 709/220 |
| 6,938,095 B2 | 8/2005 | Basturk et al. | | 709/238 |
| 6,941,487 B1 | 9/2005 | Balakrish | | 714/4 |
| 6,980,534 B1 | 12/2005 | Nee et al. | | 370/329 |
| 7,042,855 B1 | 5/2006 | Gilchrist et al. | | 370/328 |
| 7,061,858 B1 | 6/2006 | Di Benedetto et al. | | 370/219 |
| 7,061,875 B1 | 6/2006 | Portolani et al. | | 370/256 |
| 7,126,923 B1 | 10/2006 | Yang et al. | | 370/256 |
| 7,127,633 B1 | 10/2006 | Olson et al. | | 714/4 |
| 7,130,305 B2 | 10/2006 | Kuukankorpi et al. | | 370/392 |
| 7,178,052 B2 | 2/2007 | Hebbar et al. | | 714/4 |
| 7,251,217 B2 | 7/2007 | Wong et al. | | 370/232 |
| 7,286,853 B2 | 10/2007 | Meier | | 455/560 |
| 7,502,865 B2 | 3/2009 | Seto | | 709/238 |
| 7,639,605 B2 | 12/2009 | Narayanan | | 370/219 |
| 7,672,228 B1 | 3/2010 | Senevirathne et al. | | 370/219 |
| 2001/0014097 A1 | 8/2001 | Beck et al. | | 370/401 |
| 2002/0016874 A1 | 2/2002 | Watanuki | | 710/51 |
| 2002/0018489 A1 | 2/2002 | Ambe et al. | | 370/475 |
| 2002/0073338 A1 | 6/2002 | Burrows et al. | | 726/13 |
| 2002/0080720 A1 | 6/2002 | Pegrum et al. | | 370/236 |
| 2002/0087716 A1* | 7/2002 | Mustafa | | 709/236 |
| 2002/0089978 A1 | 7/2002 | Wang et al. | | 370/389 |
| 2002/0091755 A1 | 7/2002 | Narin | | 709/203 |
| 2002/0103921 A1 | 8/2002 | Nair et al. | | 709/232 |
| 2002/0110148 A1 | 8/2002 | Hickman et al. | | 370/475 |
| 2002/0126671 A1 | 9/2002 | Ellis et al. | | 370/390 |
| 2002/0146008 A1 | 10/2002 | Kaplan | | 370/390 |
| 2002/0156612 A1 | 10/2002 | Schulter et al. | | 703/23 |
| 2002/0165981 A1 | 11/2002 | Basturk et al. | | 709/242 |
| 2002/0176450 A1 | 11/2002 | Kong et al. | | 370/539 |
| 2002/0184387 A1 | 12/2002 | Yamaya et al. | | 709/238 |
| 2002/0186654 A1 | 12/2002 | Tornar | | 370/225 |
| 2002/0188711 A1 | 12/2002 | Meyer et al. | | 709/223 |
| 2002/0196802 A1 | 12/2002 | Sakov et al. | | 370/432 |
| 2003/0007489 A1 | 1/2003 | Krishnan et al. | | 370/392 |
| 2003/0026248 A1 | 2/2003 | Hiroki | | 370/352 |
| 2003/0037165 A1 | 2/2003 | Shinomiya | | 709/238 |
| 2003/0051061 A1 | 3/2003 | Hank et al. | | 709/250 |
| 2003/0061533 A1 | 3/2003 | Perloff et al. | | 714/9 |
| 2003/0093557 A1 | 5/2003 | Giraud et al. | | 709/239 |
| 2003/0097470 A1 | 5/2003 | Lapuh et al. | | 709/239 |
| 2003/0110344 A1 | 6/2003 | Szczepanek et al. | | 711/100 |
| 2003/0142680 A1 | 7/2003 | Oguchi | | 370/400 |
| 2003/0152101 A1 | 8/2003 | Feng | | 370/445 |
| 2003/0169734 A1 | 9/2003 | Lu et al. | | 370/386 |
| 2003/0172147 A1 | 9/2003 | Chang et al. | | 709/223 |
| 2003/0198231 A1 | 10/2003 | Kalkunte et al. | | 370/395.31 |
| 2004/0057469 A1 | 3/2004 | Nuss et al. | | 370/535 |
| 2004/0066781 A1 | 4/2004 | Shankar et al. | | 370/389 |
| 2004/0078621 A1 | 4/2004 | Talaugon et al. | | 714/4 |
| 2004/0098501 A1 | 5/2004 | Finn | | 709/236 |
| 2004/0156390 A1 | 8/2004 | Prasad et al. | | 370/466 |
| 2004/0179507 A1* | 9/2004 | Batra et al. | | 370/343 |
| 2004/0208116 A1 | 10/2004 | Saint Etienne et al. | | 370/216 |
| 2005/0036488 A1 | 2/2005 | Kalkunte et al. | | 370/389 |
| 2005/0041665 A1 | 2/2005 | Weyman et al. | | 370/390 |
| 2005/0044186 A1 | 2/2005 | Petrisor | | 709/219 |
| 2005/0063395 A1 | 3/2005 | Smith et al. | | 370/399 |
| 2005/0083933 A1 | 4/2005 | Fine et al. | | 370/390 |
| 2005/0089014 A1 | 4/2005 | Levin et al. | | 370/351 |
| 2005/0111483 A1 | 5/2005 | Cripe et al. | | 370/463 |
| 2005/0169311 A1* | 8/2005 | Millet et al. | | 370/471 |
| 2005/0193114 A1 | 9/2005 | Colby et al. | | 709/226 |
| 2005/0198371 A1 | 9/2005 | Smith et al. | | 709/238 |
| 2005/0243826 A1 | 11/2005 | Smith et al. | | 370/392 |
| 2005/0259646 A1 | 11/2005 | Smith et al. | | 370/389 |
| 2005/0265346 A1 | 12/2005 | Ho et al. | | 370/392 |
| 2006/0015643 A1 | 1/2006 | Orava et al. | | 709/238 |
| 2006/0215679 A1 | 9/2006 | Musoll et al. | | 370/412 |
| 2007/0159971 A1 | 7/2007 | Zhang et al. | | 370/230 |
| 2007/0180266 A1 | 8/2007 | Kang et al. | | 713/189 |
| 2009/0080431 A1 | 3/2009 | Rekhter | | 370/392 |
| 2009/0134996 A1 | 5/2009 | White | | 340/538 |

FOREIGN PATENT DOCUMENTS

| | | | | |
|---|---|---|---|---|
| EP | 1 035 685 | | 9/2000 | 12/18 |
| EP | 1 309 135 A1 | | 5/2003 | |
| EP | 1 401 147 | | 3/2004 | 12/26 |
| EP | 1 401 147 A1 | | 3/2004 | 12/26 |
| GB | 2 362 538 | | 5/2000 | |
| WO | WO 00/72531 | | 11/2000 | |
| WO | WO 00/78004 | | 12/2000 | |
| WO | WO 02/01413 | | 5/2001 | |
| WO | WO 02/18965 | | 3/2002 | 31/8 |
| WO | WO 03/081451 | | 10/2003 | |

OTHER PUBLICATIONS

Cisco Catalyst 3750 Series Switches: "Cisco StackWise Technology White Paper;" 8 pages; http://www.cisco.com/en/US/products/hw/switches/ps5023/products_white_paper09186a00801b096a.shtml (Catalyst 3750 announced on Apr. 15, 2003, see AJ).

Hewlett Packard, "LAN Aggregation Through Switch Meshing," XP-002284775, Jun. 1998, URL:http:/www.hp.com/rnd/library/pdf/techlib_meshing.pdf [retrieved on Jun. 16, 2004], 12 pages.

Huang, et al., "An Open Solution to Fault-Tolerant Ethernet: Design, Prototyping, and Evaluation," Performance, Computing and Communications Conference, 1999 IEEE International (Feb. 10-12, 1999), Scotsdale, Arizona, XP010323654, ISBN 0-7803-5258-0, Feb. 10, 1999, pp. 461-468.

Michael Ward; "802.1S Solves Architecture Issues;" *Network World*, Aug. 4, 2003; 3 pages; http://www.n wfusion.com/cgi-bin/mailto/x.cgi.

Cisco Systems, Inc.; Copyright 1989-1997 © http://www.cisco.com/univercd/cc/td/doc/product/rtrmgmt/sw_ntman/cwsimain/cwsi2/cwsiug2/vlan2/stpapp.htm "Understanding Spanning—Tree Protocol," Appendix C, pp. C-1 through C-12.

D.T. Stott, "Layer-2 Path Discovery Using Spanning Tree MIBs", Avaya Labs Research, Avaya, Inc., Mar. 7, 2002, pp. 1-23.

Nortel Networks, "Split Multi-link Trunking," http://www.nortelnetworks.com/corporate/technology/smlt/, pp. 1-2, (printed Jul. 17, 2003).

Nortel Networks, "Split Multi-link Trunking FAQs," http://www.nortelnetworks.com/corporate/technology/smlt/faq.html, pp. 1-3 (printed on Oct. 21, 2003).

Michael R. Smith, Jeffrey YM Wang, Ali Golshan; "Port-Based Loadsharing for a Satellite Switch;" U.S. Appl. No. 10/690,348, filed Oct. 21, 2003.

International Search Report as mailed from the PCT on Mar. 18, 2005, for International Application No. PCT/US2004/034851, 2 pages.

International Search Report dated Aug. 2, 2005, from related International Application No. PCT/US2004/029554, 6 pages.

International Search Report dated Jan. 14, 2005 from corresponding International Application No. PCT/US2004/029553, 4 pages.

Pedroso, Carlos Marcelo and Fonseca, Keiko, *Modeling Weight Round Robin Packet Scheduler With Petri Nets*, Communication Systems, IEEE, vol. 1, Nov. 25, 2002, pp. 342-345.

Liu, Dake, et al, *Configuration-Based Architecture for High Speed and General-Purpose Protocol Processing*, Signal Processing Systems, IEEE, Oct. 20, 1999, pp. 540-547.

* cited by examiner

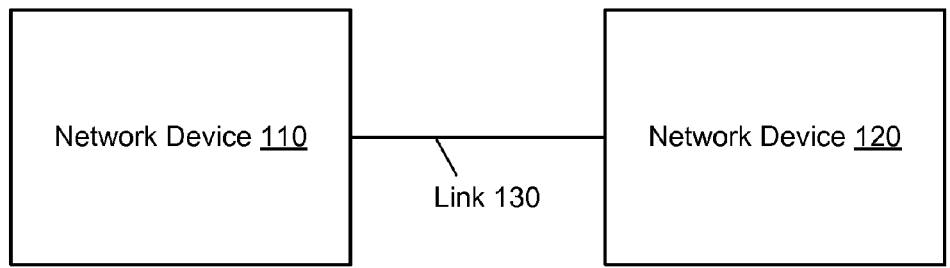
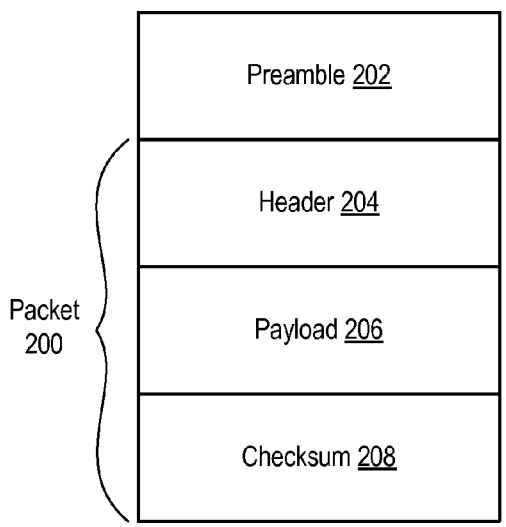
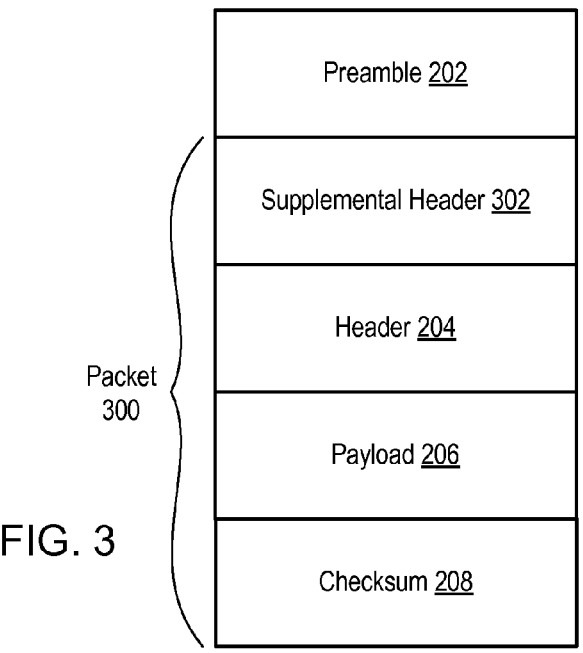

Standard Ethernet Preamble 400

| Byte 1 | 1 0 1 0 1 0 1 0 |
| Byte 2 | 1 0 1 0 1 0 1 0 |
| Byte 3 | 1 0 1 0 1 0 1 0 |
| Byte 4 | 1 0 1 0 1 0 1 0 |
| Byte 5 | 1 0 1 0 1 0 1 0 |
| Byte 6 | 1 0 1 0 1 0 1 0 |
| Byte 7 | 1 0 1 0 1 0 1 0 |
| Byte 8 | 1 0 1 0 1 0 1 1 |

FIG. 4

Information-Carrying Preamble 500

| Byte 1 | SOP |
| Byte 2 | OAM |
| Byte 3 | Message Channel |
| Bytes 4-7 | Application-Specific Information Field |
| Byte 8 | Checksum |

FIG. 5

METHOD AND APPARATUS FOR DETECTING SUPPORT FOR A PROTOCOL DEFINING SUPPLEMENTAL HEADERS

CROSS-REFERENCE TO RELATED APPLICATIONS

This application is a continuation of U.S. patent application Ser. No. 10/881,074, entitled "Method and Apparatus for Detecting Support for A Protocol Defining Supplemental Headers", filed Jun. 30, 2004 now U.S. Pat. No. 7,436,836, and naming Faisal Mushtaq, Sitaram Dontu, Shreeram Bhide, Ali Golshan, and Michael R. Smith as inventors. This application is assigned to Cisco Technology, Inc., the assignee of the present invention, and is hereby incorporated by reference, in its entirety and for all purposes, as if completely and fully set forth herein.

FIELD OF THE INVENTION

This invention relates to networking and, more particularly, to detecting a network component's use of a protocol that defines supplemental headers.

DESCRIPTION OF THE RELATED ART

Network devices, such as bridges and routers, often include many components. For example, a router may include several different line cards. As a network device forwards and/or routes the packets, the different components within that network device communicate with each other.

Often, network device manufacturers implement specialized protocols within network devices in order to improve the performance or reliability of the network devices. Specialized protocols used within network devices commonly operate by attaching special headers to packets that enter the network device. The special headers include information that is used by various components within the network device. For example, each line card within a network device supports a protocol that tags incoming packets with special headers. The special headers include information obtained by performing a forwarding lookup or by applying access controls to the packets. The special headers are typically removed before the packets exit the network device. Such specialized protocols are often proprietary protocols that are specific to a particular network device manufacturer.

Typically, all of the components within a network device will be guaranteed to support the specialized protocol. For example, some network devices only accept a particular vendor's line cards. Each of that vendor's line cards support the specialized protocol, and thus it is ensured that all of the line cards within the network device will support the specialized protocol. Accordingly, there is typically no need to determine whether a particular component within the network device supports the specialized protocol. Since it is assumed that all components within a particular network device or network environment will support the specialized protocol, mechanisms for identifying whether a particular component actually supports the specialized protocol are not implemented.

In certain situations, it is desirable to extend the situations in which a specialized protocol can be used to environments in which it cannot be assumed that all components will support the specialized protocol. Accordingly, it is desirable to be able to determine whether a component supports a specialized protocol.

SUMMARY OF THE INVENTION

Various embodiments of methods and systems for detecting whether a network device supports a protocol, which defines a supplemental header, are disclosed. In some embodiments, a method involves detecting a value within a preamble generated by a sending device and verifying that a header format of a header, also generated by the sending device, conforms to a header format definition of a protocol. Such a method can be performed by a receiving device coupled to the sending device. The header format definition of the protocol defines a supplemental header. The header format of the header is verified in response to the detecting the value within the preamble. The value can be detected within the preamble by detecting at least a portion of a token within the preamble. The preamble can be an Ethernet preamble (i.e., a preamble sent on an Ethernet link). In one embodiment, the preamble is a converged data link (CDL) preamble or other type of preamble that is used to convey operation, administration and management (OAM) information. After the header format of the header is verified, the device that performed the verification can also send supplemental headers that conform to the header format definition to the sending device.

The header format of the header can be verified after the detection of an Nth token within an Nth preamble. Detecting the Nth token can involve detecting a change in value of a field in each of N consecutively-received preambles. Information (e.g., a device identifier) can be extracted from an N+1th preamble in response to verification of the header format of the header. Such information can be used to detect a configuration error (e.g., a loopback error).

In other embodiments, a method involves sending a preamble, which includes a value, and then subsequently sending a header. The value identifies that a header format of the header conforms to a header format definition of a protocol. Such a method can be performed by a sending device coupled to a receiving device. The header format definition defines a supplemental header. Multiple preambles can be sent. Each of the preambles can include a respective token. An additional preamble, which includes a device identifier, can subsequently be sent.

In one embodiment, a system includes a first network device and a second network device, which is coupled to the first network device. The second network device is configured to detect a value within a preamble, which is generated by the first network device. In response to detecting the value within the preamble, the second network device is configured to verify that a header format of a header, also generated by the first network device, conforms to a header format definition of a protocol. The header format definition defines a supplemental header. The first network device is similarly configured to detect the value within a second preamble, generated by the second network device, in order to verify that a header format of a second header, also generated by the second network device, conforms to the header format definition of the protocol.

In one embodiment, an apparatus includes an interface. The interface includes a supplemental header verification module. The interface can also include a preamble verification module. The interface is configured to receive a first preamble. The supplemental header verification module is configured to detect a value within the first preamble, in response to the preamble verification module detecting that the first preamble is an information-carrying preamble. The supplemental header verification module is configured to identify that a first header is a supplemental header, in response to detecting the value within the first preamble.

The interface can also include a configuration error detection module. The interface is configured to receive a first preamble, and the configuration error detection module is configured to detect a loopback error in response to detecting a value within the first preamble.

In another embodiment, an apparatus includes an interface, which includes a preamble generation module. The preamble generation module is configured to include a value within a preamble. The value indicates that a header format of a supplemental header conforms to a header format definition of a protocol.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 1 illustrates a system in which one network device determines whether another network device supports a protocol, which defines a supplemental header, based on information contained in a preamble, according to one embodiment of the present invention.

FIG. 2 shows the contents of a packet generated by a network device that does not support the protocol that defines the supplemental header.

FIG. 3 shows the contents of a packet generated by a network device that does support the protocol that defines the supplemental header.

FIG. 4 illustrates a typical Ethernet preamble.

FIG. 5 shows an example of an information-carrying preamble.

Figure 6:
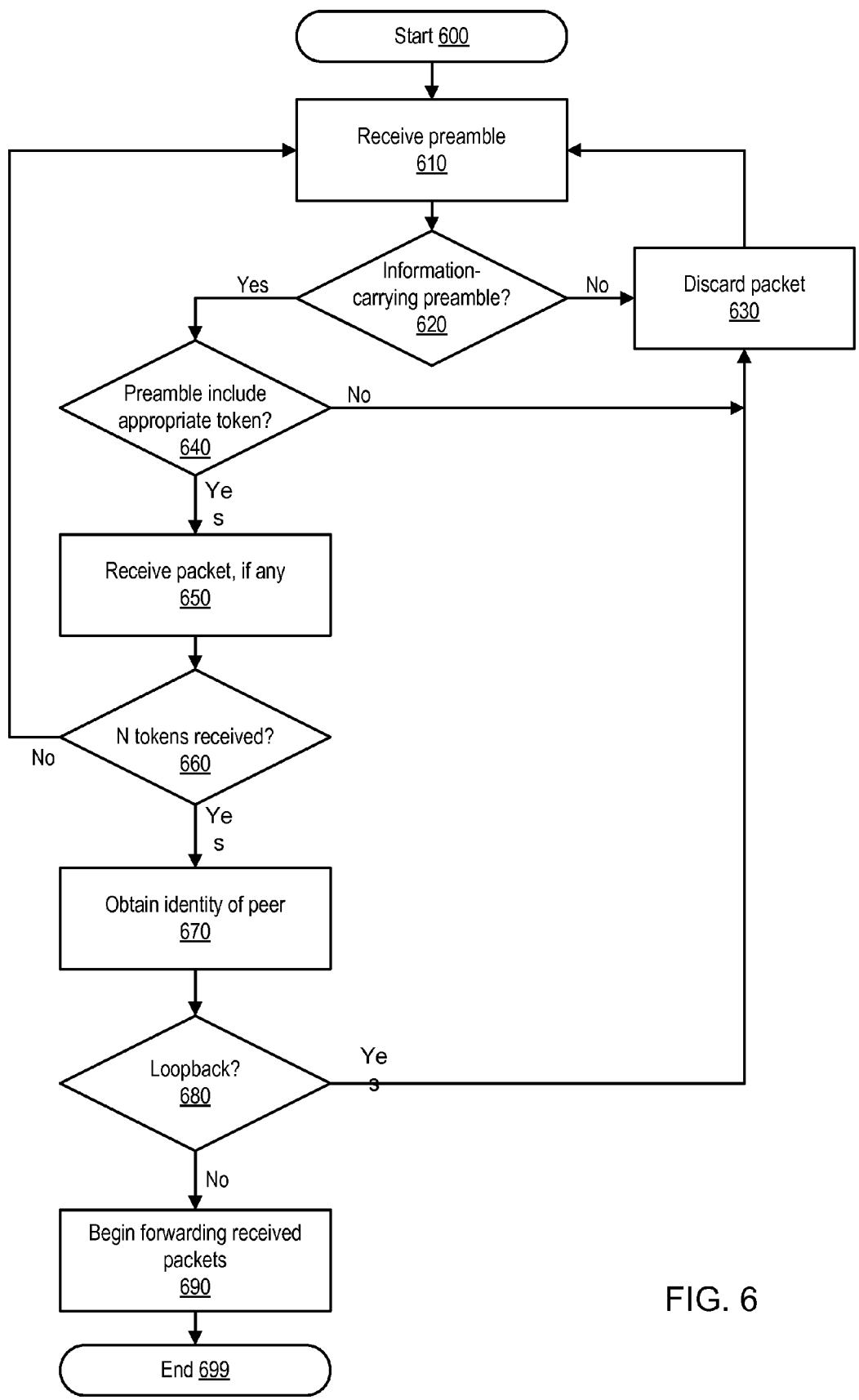
FIG. 6 is a flowchart illustrating the manner in which a network device determines whether a peer network device supports the protocol that defines the supplemental header, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 shows two network devices, network device 110 and network device 120. Network device 110 is coupled to network device 120 by link 130. Network devices 110 and 120 can be routers, bridges, switches, or any other type of network device. Network devices 110 and 120 can also be components (e.g., line cards) of such routers, bridges, switches, and the like.

In this example, link 130 is an Ethernet link. Network devices 110 and 120 send Ethernet packets to each other via link 130. Each packet is preceded by a preamble. If no packets are being sent via the link (i.e., if the link is idle), network devices 110 and 120 send preambles to each other. (It is noted that in alternative embodiments, preambles are not sent during idle periods.)

Network device 110 is configured to support a protocol that defines a supplemental header. Network devices that support the protocol exchange information with each other through the use of supplemental headers, which are appended to packets being exchanged between the network devices. Packets that are exchanged between devices that support the protocol will include the supplemental header in addition to any other headers that are already part of the packet. For example, all Ethernet packets sent by network device 120 include an Ethernet header. If network device 120 is an Ethernet device and network device 120 also supports the protocol that defines the supplemental header, packets sent from network device 120 will include both the normal Ethernet header and the supplemental header. The protocol defines the supplemental header by specifying features such as the content and/or format of the supplemental header.

Non-supplemental headers are headers that include information used by all network devices to route and/or forward packets, regardless of whether those network devices support the protocol that defines the supplemental header. In many situations, supplemental headers are indistinguishable from non-supplemental headers. For example, the supplemental header definition may not include a value that is guaranteed to be unique to supplemental headers. If the information in the supplemental header does not uniquely identify that the header is a supplemental header, a device that receives a supplemental header will be unable to determine whether to interpret the supplemental header as a supplemental header or as a non-supplemental header. If the receiving network device interprets a supplemental header as a non-supplemental header, or vice versa, forwarding errors are likely to result. For example, if the network device interprets a supplemental header as an Ethernet header, the device will interpret a portion of the supplemental header as a destination address. However, this portion of the supplemental header may not include addressing information. Accordingly, an attempt to use this information as the packet's destination address is likely to result in the packet being sent to an incorrect destination or otherwise mishandled.

In order to avoid errors due to misinterpreting a header, network device 110 needs to determine whether network device 120 supports the protocol that defines the supplemental header. In other words, network device 110 needs to determine whether packets sent by network device 120 include supplemental headers. Network device 110 determines whether network device 120 supports the protocol by checking preambles generated by network device 120 for one or more special values. If network device 110 detects the special value(s) within the preambles generated by network device 120, network device 110 determines that network device 120 supports the protocol. Otherwise, network device 110 determines that network device 120 does not support the protocol. In the latter situation, network device 110 can also signal a configuration error.

Additionally, network device 120 can also determine whether network device 110 supports the protocol that defines the supplemental header. In order to inform network device 120 that network device 110 supports the protocol, network device 110 sends one or more preambles containing one or more special values to network device 120.

FIG. 2 shows packet 200, which includes a non-supplemental header (header 204) but does not include a supplemental header. In this example, packet 200 is preceded by preamble 202. Packet 200 includes non-supplemental header 204, payload 206, and checksum 208. Contents of the packet are transmitted in order, from top to bottom of FIG. 2. Thus, preamble 202 is transmitted first, followed by non-supplemental header 204, payload 206, and checksum 208.

FIG. 3 illustrates packet 300, which includes a supplemental header 302 defined by a protocol. Like packet 200, packet 300 is also preceded by a preamble 202. Packet 300 includes supplemental header 302, non-supplemental header 204, payload 206, and checksum 208.

It is noted that a non-supplemental header is a portion of a packet (typically transmitted before the payload, or data, portion of the packet) that includes information used by a corresponding routing or forwarding protocol. For example, a typical non-supplemental header includes addressing information that is appropriate for use with a corresponding protocol (e.g., an Ethernet header would include a source Media Access Control (MAC) address and a destination MAC address). A supplemental header is a portion of a packet (e.g., transmitted before the non-supplemental header of the packet) that is provided in addition to the existing portions (e.g., non-supplemental header, payload, and checksum) of a packet. The contents of supplemental headers are not necessary for the operation of the routing or forwarding protocol that determines the contents of non-supplemental headers. Additionally, it is noted that a preamble is neither a supplemental header nor a non-supplemental header. A preamble includes a value that can be used to facilitate the proper reception of packets (e.g., by synchronizing transmitting and receiving devices and/or informing a receiving device that a packet is about to be transmitted).

In the example of FIG. 1, network device 110 is initially unaware of whether packets generated by network device 120 will be the packets of FIG. 2 or the packets of FIG. 3. Furthermore, the information in the packets generated by network device 120 may not include information that allows network device 110 to determine whether the packets are of the type shown in FIG. 2 or of the type shown in FIG. 3. It is noted that network device 120 may also initially not be aware of the type of packets being generated by network device 110.

When network devices 110 and 120 are powered on, network devices 110 and 120 begin exchanging information via link 130. As mentioned above, network device 110 is configured to parse one or more preambles, received from network device 120 via link 130, for certain information. If the information is detected with the preamble(s), network device 110 determines that network device 120 supports the protocol that defines the supplemental header. Accordingly, network device 110 determines that network device 120 is generating packets, such as packet 300 of FIG. 3, that include the supplemental header. If the information is not detected within any preambles generated by network device 120, network device 110 determines that network device 120 does not support the protocol that defines the supplemental header. In this situation, network device 110 determines that network device 120 is generating packets, like packet 200 of FIG. 2, that lack the supplemental header.

If network device 110 determines that network device 120 does support the protocol, network device 110 will treat the first portion of each packet received from network device 120 as a supplemental header (the size of the first portion is determined by the definition of the supplemental header provided in the protocol). Network device 110 will then handle the next portion of the packet as a non-supplemental header.

By detecting whether network device 120 supports the protocol, network device 110 is able to detect certain types of configuration errors. For example, in one embodiment, an interface of network device 110 is configured to operate in a mode that depends on the supplemental header. If this interface is erroneously connected to an interface that does not support the protocol that defines the supplemental header, the interface will be unable to perform properly. Accordingly, if the interface of network device 110 fails to detect the appropriate information in preambles generated by network device 120, the interface causes a configuration error to be generated. Additionally, the interface can discard all packets received from network device 110, since the interface will be unable to interpret those packets correctly.

FIG. 4 illustrates a standard Ethernet preamble 400. Preamble 400 is eight bytes long. Preamble repeats value "01" for seven bytes. In the eighth byte, "01" is repeated three times, followed by the value "11". The values of each byte of preamble 400 simply indicate that the preamble is a standard Ethernet preamble. Because the value of each bit of preamble 400 is pre-defined, preamble 400 cannot be used to carry any other information.

FIG. 5 illustrates preamble 500. Like preamble 400, preamble 500 is used in an Ethernet environment. Unlike preamble 400, however, preamble 500 can be used to carry information (accordingly, preamble 500 is identified as an "information-carrying preamble" in FIG. 5). Preamble 500 is defined by a protocol such as Converged Data Link (CDL), which is used by Cisco Systems, Inc. to convey operation, administration, and management (OAM) information between network devices in an Ethernet network. It is noted that other types of information-carrying preambles, which can include different fields than those shown in FIG. 5, can be used in other embodiments.

Preamble 500 includes eight bytes. The first byte, byte 1, includes a start of packet (SOP) field (the value of this field is used by the receiving device to synchronize packet reception). The next byte, byte 2, includes OAM information, including various defect indications. In one embodiment, the OAM field includes several subfields, including a packet type field (not shown) that is two bits in length. The packet type field can have a value of "10", "00", or "11" (in some embodiments, only values "10 and "00" are used). The value "01" is not allowed in the packet type field of an information-carrying preamble of FIG. 5 because "01" is the value that is defined at the same bit location within a normal, non-information-carrying Ethernet preamble of FIG. 4. Accordingly, in this embodiment, normal Ethernet preambles are distinguished from information-carrying Ethernet preambles by checking to see whether or not the value of the bit positions corresponding to the packet type field in a given preamble equal "01". If the values are equal, the preamble is a normal, non-information-carrying preamble. Otherwise, the packet is identified as an information-carrying preamble.

If the preamble is a CDL preamble, a packet type field value of "00" indicates that a packet will follow the preamble. If instead the packet type field has a value of "10", it indicates that the link is idle, and thus no packet will follow the preamble (instead, another preamble will follow the current preamble). Packet type field value "11" is reserved in CDL. However, a preamble in which the value of the bits corresponding to the CDL packet type field is "11" can also be defined, and such a preamble can be used to convey information indicating whether the sending device supports a protocol that defines a supplemental header.

Byte 3 of preamble 500 is used as a message channel. Various applications can send a message, one byte at a time, by including successive portions of the message in byte 3 of successive preambles.

Bytes 4-7 of preamble 500 include application-specific information. Various applications can use one or more of bytes 4-7 to convey information used by that application. The application-specific information field differs from the message channel in that more than one byte of application-specific information can be sent in a single preamble. The message channel and application-specific information field illustrate how a preamble can convey information.

The final byte of preamble 500 includes a checksum that can be used to verify the other portions of preamble 500. This checksum is generated from the values of one or more of the other portions of preamble 500. The receiving network device verifies the contents of the other portions of the preamble by recalculating the checksum and comparing the recalculated checksum to the received checksum.

Information-carrying fields such as the message channel and application-specific information field are used to convey information that identifies whether the sending device supports are protocol that defines a supplemental header. For example, in one embodiment, the sending device is configured to include a token in the application-specific information field to identify that the sending device supports a protocol that defines a supplemental header. In other embodiments, a sequence of tokens are used to identify that the sending device supports the protocol (e.g., in order to reduce the likelihood of erroneously detecting that the sending device does or does not support the protocol). The sending device includes one token in the application-specific information field of each preamble until the entire sequence of tokens has been sent.

FIG. 6 illustrates the manner in which a network device uses information included in preambles to determine whether a peer network device supports a particular protocol that defines supplemental headers. This method can be used by a network device each time the network device is powered on and/or each time a link is connected to the network device.

The method begins at 600. At 610, the network device receives a preamble from the peer network device. The preamble can be either a normal preamble, which does not include any information, or an information-carrying preamble, which can include information.

At 620, the network device determines whether the preamble, received at 610, is an information-carrying preamble. As noted above, information-carrying preambles can be distinguished from non-information-carrying preambles by examining the value of one or more bits within the preamble. For example, CDL preambles include either the binary value of "00" or "10" at a position within the preamble that would have the binary value "01" in a normal Ethernet preamble. Thus, if the network device is determining whether the preamble is a CDL preamble or a normal Ethernet preamble, the network device detects whether a particular field within the received preamble has a value of "00" or "10" (or simply whether that field has a value other than "01").

If the preamble is not an information-carrying preamble (as determined at 620), the preamble will not include any information that can be used to determine whether the peer network device supports the protocol that defines the supplemental header. In this embodiment, if the preamble is not an information-carrying preamble, the network device discards the packet (if any) received subsequent to that preamble, as indicated at 620-630. By discarding the packet, the network device will not accidentally misinterpret the subsequent packet (e.g., by attempting to treat a normal header as a supplemental header, or vice versa).

If the preamble is an information-carrying preamble (as determined at 620), the network device next uses information included in the preamble to determine whether the peer network device supports supplemental headers. In this example, the information is conveyed in the form of N tokens, wherein N is an integer greater than or equal to one. If N is greater than 1 (N>1), each token is conveyed in a different preamble. For example, if three tokens T1-T3 are used to verify whether a peer network device supports supplemental headers, T1 is conveyed in preamble X, T2 is conveyed in preamble X+1, and T3 is conveyed in preamble X+2.

As shown, the network device determines whether the preamble includes an appropriate token, as shown at 620 and 640. For example, the network device can detect the appropriate preamble by parsing the preamble (or one or more selected fields of the preamble) for one or more different values. If the preamble includes the appropriate token, the network device will receive (as opposed to discarding) the packet (if any) that is sent subsequent to the preamble, as shown at 650. The network device can receive the packet, for example, by storing the packet into an input buffer. If the preamble does not include the appropriate token, any subsequent packet is discarded, as shown at 640 and 630.

In the example of FIG. 6, the network device checks for N tokens, each within a successive preamble, before verifying that the peer network device supports supplemental headers. Thus, if N tokens have not already been received, as determined at 660, the network device will receive the next preamble (by performing function 610 again) and check that preamble for an appropriate token, as described above.

In one embodiment, the value of N is one. However, in at least some situations, using a value of N that is greater than one may reduce the likelihood that the network device will erroneously verify the peer network device as supporting supplemental headers. For example, there may be a chance that an application running on the peer network device will inadvertently generate the same value as one of the tokens used in verification. However, the chance that applications running on the peer network device will generate a series of tokens may be significantly lower. In such a situation, a set of multiple tokens is used for verification. In some embodiments, the same token is used for verification each of N times (e.g., each time function 640 is performed, the network device looks for the same value within the preamble). In other embodiments, each token from 1 to N has a different value. For example, the network device can check for three tokens, having respective values of 64, 127, and 3. Thus, performing function 640 involves checking the preamble for one of the three different values, and then verifying that the peer network device supports supplemental headers after each of the three different values has been detected within a preamble.

In some embodiments, the order in which the tokens are received is also pre-specified. In such embodiments, performing function 640 involves looking for a particular value, based on which value(s) have already been detected in preceding preambles. The number of intervening preambles between those preambles carrying the tokens can be specified (e.g., in one embodiment, no intervening preambles are allowed). For example, in one embodiment, the network device will only detect that the peer network device supports supplemental headers if the network device receives four successive preambles, in which the first preamble contains a token having a value of 10, the second preamble contains a token having a value of 227, the third preamble contains a token having a value of 1,014, and the fourth preamble contains a token having a value of 599.

Once N appropriate tokens have been detected ("appropriate" tokens having the appropriate value and being received in a predesignated order, if any), as determined at 660, the network device verifies that the peer network device supports the protocol used to generate supplemental headers. In some embodiments, verification (using preambles, at least) is complete at this point.

In the illustrated example, the network device also uses information included in a preamble to check for a configuration error. It is noted that in alternative embodiments, such information is obtained from another field of a preamble that includes one of the N tokens. For example, information used to detect a configuration error can be included in the message channel of a preamble, while a token used to verify support for a protocol that defines supplemental headers can be included in the application specific information field of the same preamble. Alternatively, information used to detect a configuration error can be included in a supplemental header appended to a packet, which is received subsequently to the N preambles that include the tokens.

In FIG. 6, at 670, the network device obtains the device identifier of the peer network device from the next preamble received. The device identifier can be included in the same field of the preamble that was used to convey the N tokens. Based on the device identifier, the network device checks for a loopback error, as shown at 680, which occurs when two interfaces of the same network device are accidentally connected to each other. If the device identifier received in the preamble is the same as the device identifier of the network device, the network device detects a loopback error and begins discarding subsequently received packets, as shown at 680 and 630. The network device can also generate an error indication (e.g., by sending a message to an administrator) if a loopback error is detected. If the device identifier received at 670 is different than the device identifier of the network device, the network device determines that the interface is coupled to another network device, and thus no loopback error has occurred. In this example, the network device then begins forwarding packets received from the peer network device, as shown at 690. The method then finishes at 699.

The method of FIG. 6 can be performed a single time (e.g., when the network device is powered on) or continuously. For example, after verifying that the peer network device is generating supplemental headers for the first time, the network device can repeat function 610 and begin re-verifying subsequently received preambles. Accordingly, each preamble received by the network device can be examined to see if the preamble contains a token or device ID. In other embodiments, the method of FIG. 6 is performed more than once subsequent to device start-up, but not continuously (e.g., the method can be performed at certain time- and/or event-based intervals).

It is noted that in some embodiments (e.g., embodiments using CDL preambles to convey the tokens), preambles, which are used to verify that the peer network device supports the protocol and/or to verify that no configuration errors have occurred, are sent when the link is idle (i.e., when data packets are not being sent on the link). This allows the verification to be performed without causing spurious data traffic on the link.

Figure 7:
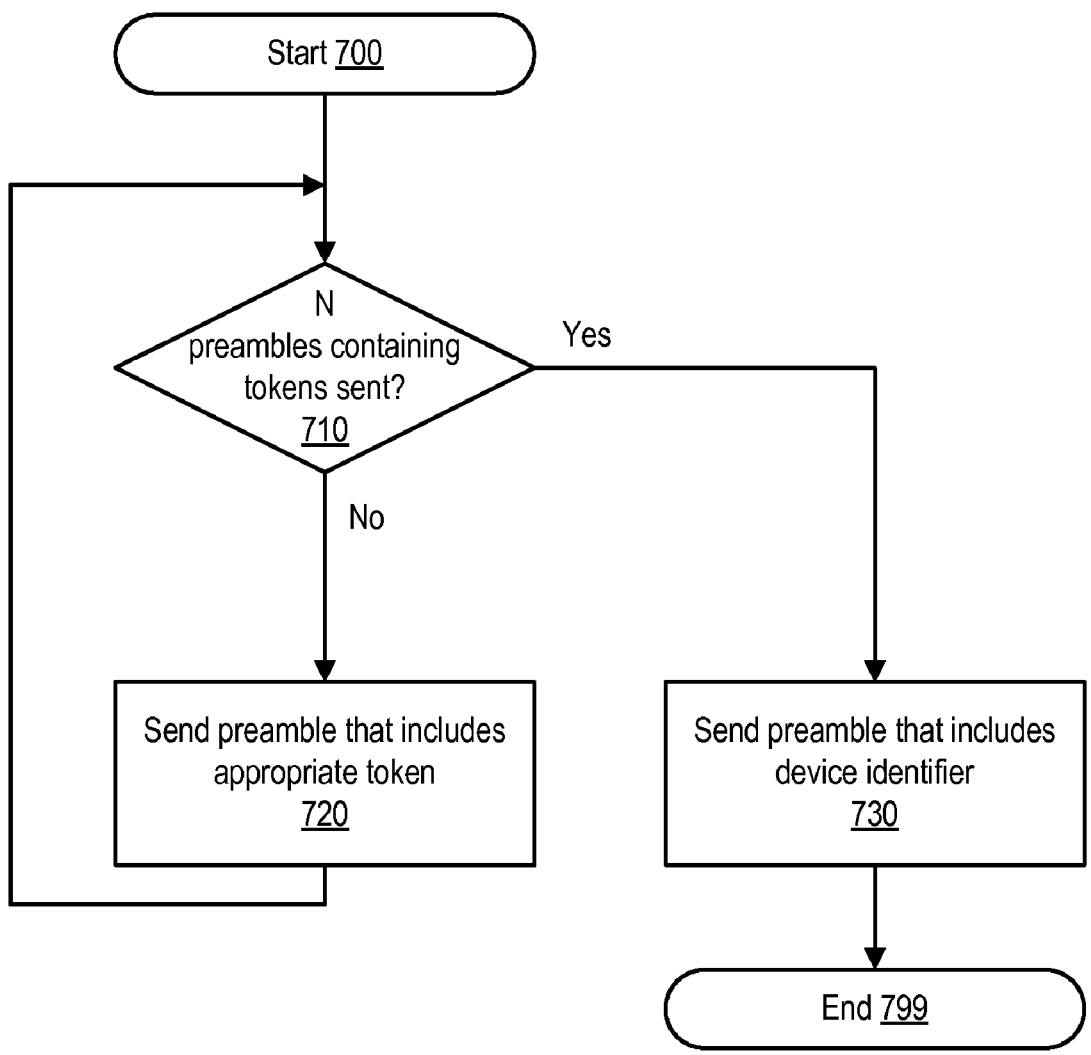
FIG. 7 is a flowchart illustrating the manner in which a network device includes information in a preamble, according to one embodiment of the present invention.

FIG. 7 illustrates the manner in which the network device (e.g., network device 110 of FIG. 1) sends preambles to the peer network device (e.g., network device 120 of FIG. 1), allowing the peer network device to also perform verification (e.g., the peer network device can use the method of FIG. 6). The method of FIG. 7 can also be performed by the peer network device when generating preambles to send to the network device.

The method of FIG. 7 begins at 700. As in the example of FIG. 6, N tokens are used to verify whether a network device supports supplemental headers in the example of FIG. 7. A shown at 710 and 720, if N preambles containing tokens have not already been sent, the network device sends a preamble that includes an appropriate token. Performing function 720 can involve including a particular value within a particular field of the preamble. The particular value to include depends on the verification scheme being used. For example, if N is greater than one and if there is a predesignated order of the N tokens, the particular value to include will depend on the value of the token(s) included in previous preamble(s).

Preambles can also be used to convey information that is used to detect various configuration errors, such as loopback errors. Accordingly, as shown at 730, if N tokens have already been sent, as determined at 710, the network device can send a preamble that includes the network device's device identifier (e.g., the network device's MAC address). In one embodiment, this device identifier is included in the same field of the preamble that was used to convey the N token(s). It is noted that in other embodiments, this information is included in supplemental headers instead of (or in addition to) being included in preambles. The method of FIG. 7 ends at 799.

As with the method of FIG. 6, the method of FIG. 7 can be performed a single time (e.g., when the network device is powered on), a constant number of times (e.g., three times after the network device is powered on), continuously, or at various time- and/or event-based intervals. For example, in one embodiment, the network device repeats functions 710-730 until the network device receives a message indicating that the peer network device has successfully completed verifying that the network device supports supplemental headers and/or that no configuration errors are present.

Figure 8:
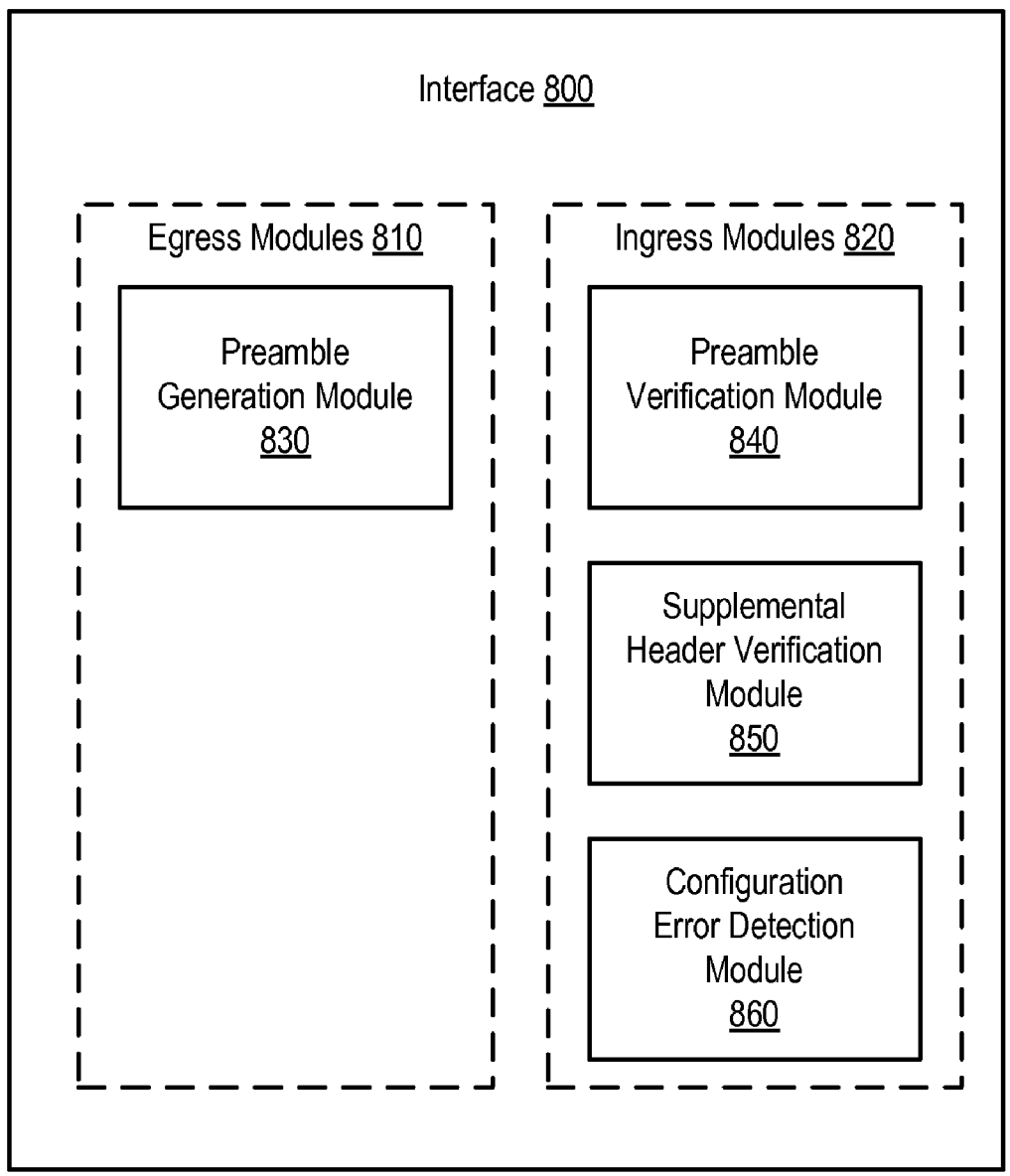
FIG. 8 is a block diagram of an interface configured to encode information in a preamble before sending the preamble and to detect information in a received preamble, according to one embodiment of the present invention.

FIG. 8 illustrates an interface of a network device (e.g., such as network device 110 of FIG. 1). Interface 800 can be coupled to one or more links (such as link 130 of FIG. 1). As shown, interface 800 includes egress modules 810, which are used when interface 800 is sending packets on the link, and ingress modules 820, which are used when interface 800 is receiving packets from the link.

Egress modules 810 include preamble generation module 830. Preamble generation module 830 operates to generate preambles that will be sent via the link. Preamble generation module 830 can operate according to the method of FIG. 7 in order to encode appropriate tokens in preambles sent by interface 800.

It is noted that, in some embodiments, interface 800 is operable in several different modes. One mode supports the protocol that defines supplemental headers. When interface 800 is operated in this mode, interface 800 sends supplemental headers along with packets on the link. Another mode does not support the protocol that defines supplemental headers. When interface 800 operates in this mode, supplemental headers are not output via the link. In embodiments that support different modes, preamble generation module 830 detects the current mode of interface 800. If the current mode does not support the protocol, preamble generation module 830 does not include appropriate tokens in outgoing preambles. If instead the current mode does support the protocol, preamble generation module 830 does include appropriate tokens in outgoing preambles.

Ingress modules 820 includes preamble verification module 840, supplemental header verification module 850, and configuration error detection module 860. Preamble verification module 840 detects whether received preambles are information-carrying preambles or not (e.g., by determining whether each received preamble is a standard Ethernet preamble or a CDL preamble). Supplemental header verification module 850 checks for one or more tokens within received preambles in order to see if a peer network device supports a protocol that defines supplemental headers. Configuration error detection module 860 detects configuration errors (e.g., such as loopback errors) based on other information that is conveyed in preambles and/or supplemental headers. Ingress modules 820 can operate to perform the method of FIG. 6.

In some embodiments, ingress modules 820 and egress modules 810 are implemented in one or more state machines. Such state machines can be implemented in one or more Application-Specific Integrated Circuits (ASICs) or Programmable Logic Devices (PLDs) such as Field Programmable Gate Arrays (FPGAs). For example, in an embodiment that uses three tokens to verify whether a peer network device supports a protocol that defines supplemental headers, a PLD includes three registers that are each programmed with the value of one of the three tokens. The PLD also includes logic for comparing a field of each of the incoming preambles with the values in the registers.

Alternatively, state machines used to implement ingress modules 820 and egress modules 830 are implemented in software. For example, the state machines can be implemented in software executing on a line card processor. Hardware at each interface generates an interrupt to the line card processor whenever a change in value of a particular information-carrying field of the preamble (such as the application-specific information field) is detected between successively-received preambles.

The program instructions executable to implement ingress modules 820 and egress modules 810 are stored on various computer readable media such as a memory (e.g., RAM (Random Access Memory)). In some embodiments, such software is stored on a computer readable medium such as a CD (Compact Disc), DVD (Digital Versatile Disc), hard disk, optical disk, tape device, floppy disk, and the like). In order be executed, the software is loaded into memory from another computer readable medium. The instructions and/or data can also be transferred to a computing device for storage in memory via a network such as the Internet or upon a carrier medium. In some embodiments, a computer readable medium is a carrier medium such as a network and/or a wireless link upon which signals such as electrical, electromagnetic, or digital signals, on which the data and/or instructions are conveyed.

Virtual Network Device

Figure 9:
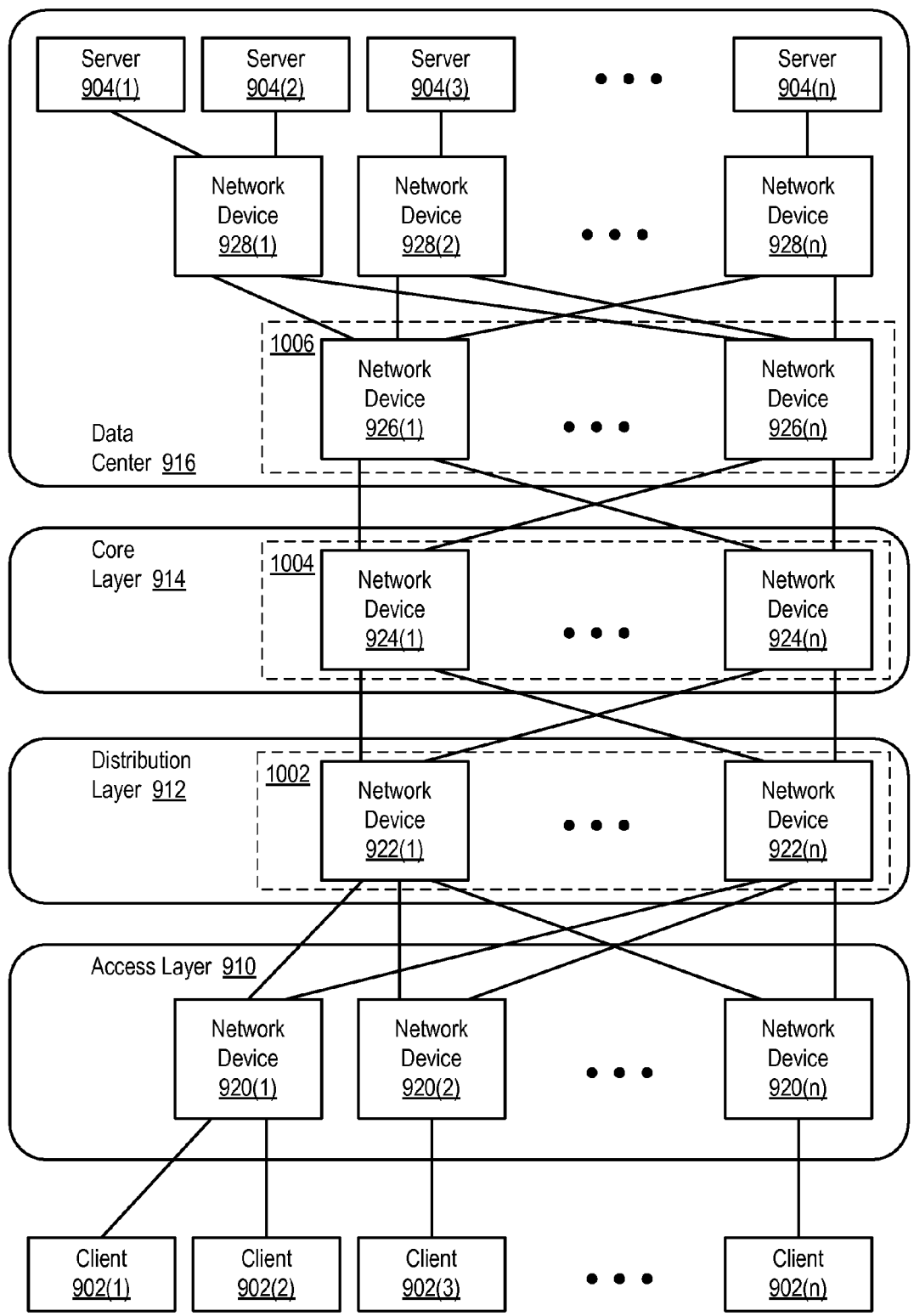
FIGS. 9-11 illustrate an example of a virtual network device that employs the methods shown in FIGS. 6 and 7.
Figure 10A:
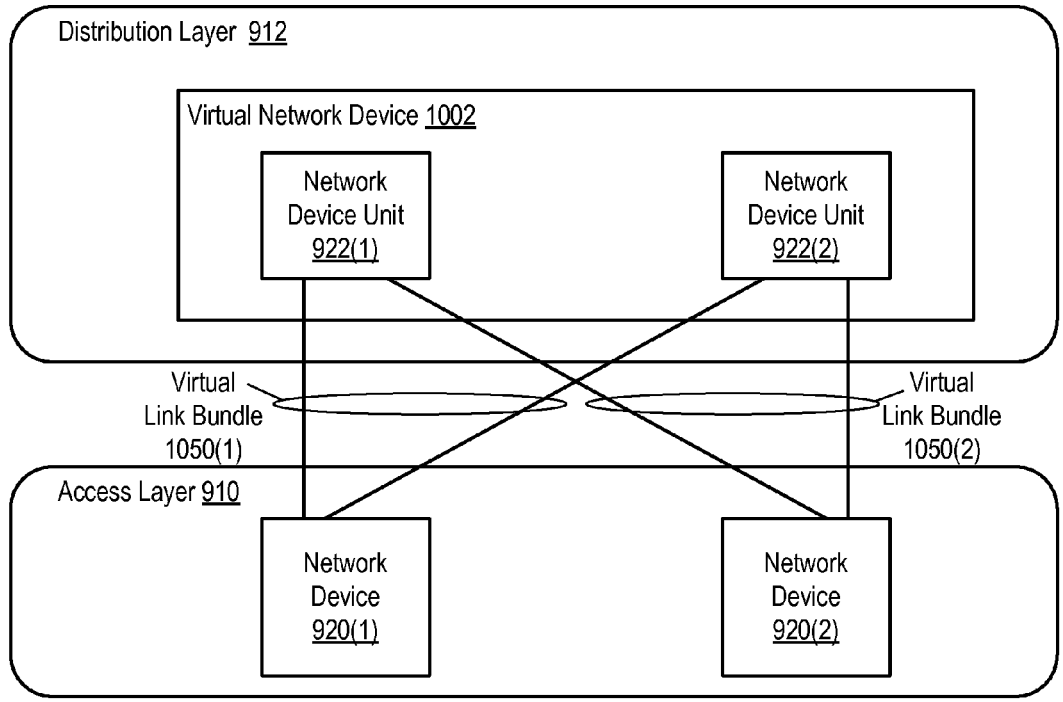
Figure 10B:
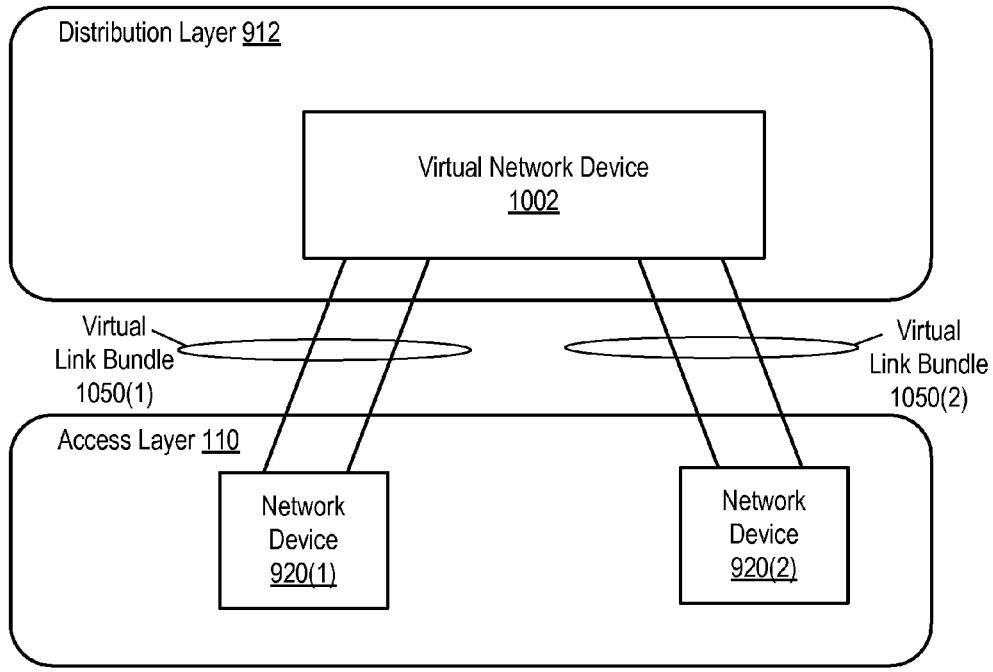
Figure 11:
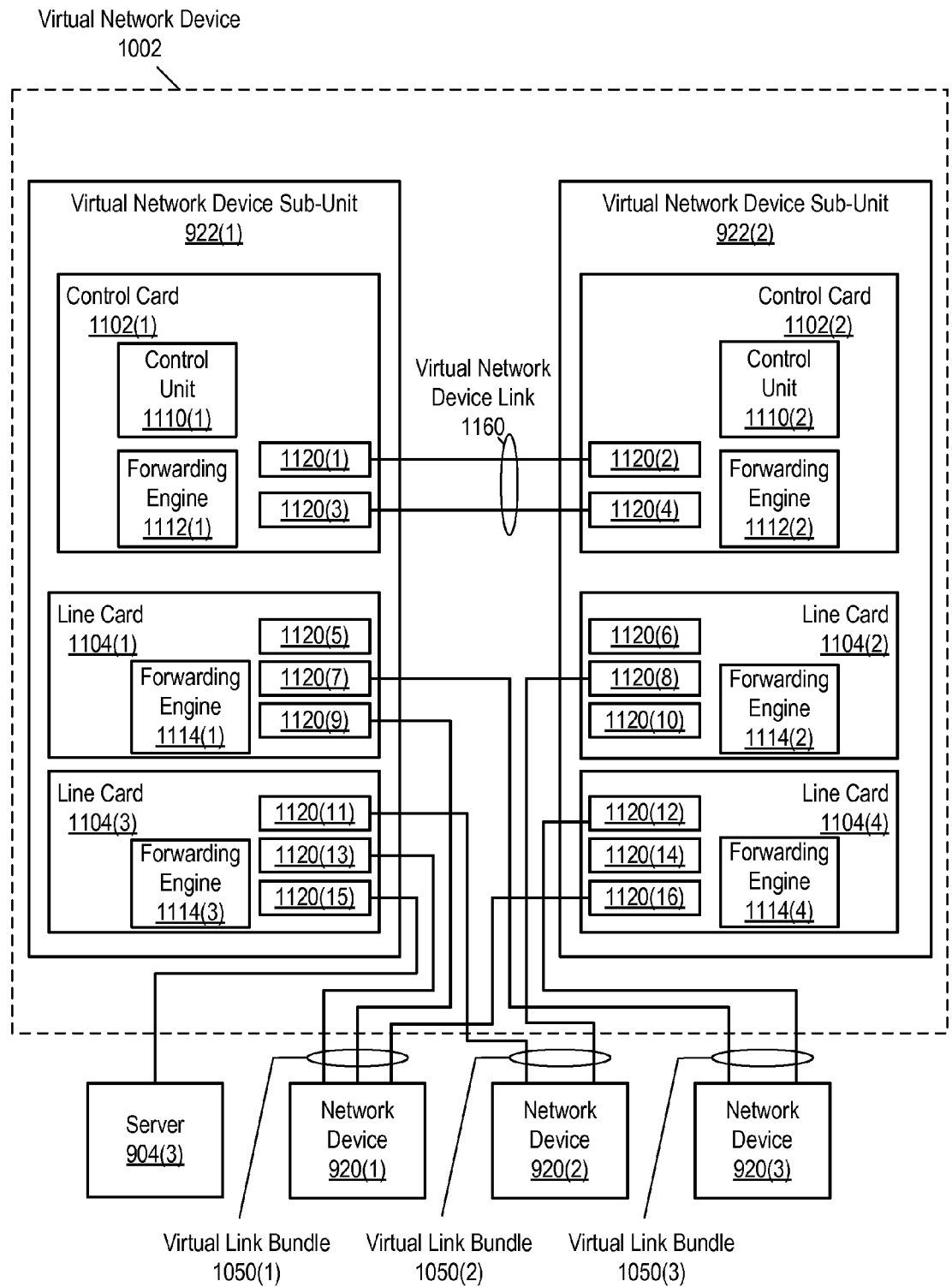

FIGS. 9-11 provide an example of an environment that includes network devices that use the above-described techniques to determine whether peer network devices support a protocol that defines supplemental headers. FIG. 9 is a block diagram of a network that includes several virtual network devices. In FIG. 9, several clients 902(1)-902(n) communicate with each other and with several servers 904(1)-904(n) via a network. Clients 902(1)-902(n) can include a variety of different devices that access networked services. For example, client 902(1) can be a cell phone, client 902(2) can be a personal computer, and client 902(n) can be a Personal Digital Assistant (PDA). Servers 904(1)-904(n) provide various services, such as various software-based services and/or access to shared storage devices.

The network coupling clients 902(1)-902(n) and servers 904(1)-904(n) is described in terms of several network layers. The layer closest to clients 902(1)-902(n) is access layer 910. Access layer 910 includes several network devices 920(1)-920(n). In this example, access layer 910 is the primary layer at which packets enter the network from clients 902(1)-902(n).

Distribution layer 912 aggregates flows received via access layer 910 and provides these aggregated flows to core layer 914. In this example, distribution layer 912 includes network devices 922(1)-922(n). Core layer 914 is a logically centralized portion of the network through which various aggregated flows pass. Core layer 914 includes network devices 924(1)-924(n).

In this example, data center 916 includes two sets of network devices: network devices 926(1)-926(n) and network devices 928(1)-928(n). Network devices 928(1)-928(n) provide access to the network to various servers 904(1)-904(n). Network devices 926(1)-926(n) aggregate flows from network devices 928(1)-928(n) and provide the aggregated flows to core layer 914.

It is noted that in some embodiments, networks will not include the network layers illustrated in FIG. 9 (e.g., some of the layers can be combined and/or eliminated, and alternative layers can also be included in addition to and/or instead of those shown in FIG. 9). Additionally, clients and servers can be coupled to the network differently than shown in FIG. 9 (e.g., some clients and/or servers can be coupled to individual network devices in the core and/or distribution layers). Additionally, the physical locations of devices relative to each other can differ from the logical locations shown in FIG. 9. For example, two devices in the same network layer can be physically located on different floors, in different buildings, or on different campuses. In contrast, two devices in different network layers can be located in the same room.

In some embodiments, network devices 920(1)-920(n) and 928(1)-928(n), which are located at the outer edges of the network, operate differently than network devices 922(1)-922(n), 924(1)-924(n), and 926(1)-926(n), which are located in the inner layers of the network. For example, in one embodiment, network devices 920(1)-920(n) are adjunct network devices that are controlled or otherwise subordinate to network devices in the inner layers (e.g., the distribution and core layers) of the network. In such an embodiments, the non-adjunct network devices provide L2 (Layer 2) and L3 (Layer 3) forwarding and routing, while adjunct network devices only have relatively limited forwarding and/or routing capabilities. In other embodiments, adjunct network devices do not perform any L2 forwarding or L3 routing. Instead, the adjunct network devices simply forward all packets to non-adjunct network devices for L2 forwarding and L3 routing. In some embodiments, non-adjunct network devices, coupled to adjunct network devices, control the operation of the adjunct network devices. In some embodiments, adjunct network devices are treated as remote line cards of the network devices to which the adjunct network devices are subordinate. It is also noted that in alternative embodiments, non-adjunct network devices are used in the access layer and data center instead of adjunct network devices.

Network devices 920(1)-920(n), 922(1)-922(n), 924(1)-924(n), 926(1)-926(n), and 928(1)-928(n) can include various routers, switches, gateways, and other network equipment. In many embodiments, only one network device may be needed at each layer in order for the network to function. However, multiple network devices can be included at each layer, as shown in FIG. 9, in order to provide redundancy.

It will be noted that the variable identifier "n" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements have the same number of elements as another series delimited by the same variable identifier (e.g., the number of network devices in each network layer may vary). Rather, in each instance of use, the variable identified by "n" (or any other such identifier) may hold the same or a different value than other instances of the same variable identifier.

Multiple links are implemented between devices in different network layers to provide additional redundancy. For example, as shown in FIG. 9, each network device 920(1)-920(n) in access layer 910 is coupled to distribution layer 912 by two (or more) different links. Similarly, each network device 922(1)-922(n) in distribution layer 912 is coupled to core layer 914 by two (or more) different links. In one embodiment, each link is an Ethernet link.

Within each network layer, multiple redundant network devices are configured to collectively operate as a single virtual network device. For example, as shown in FIG. 9, two or more network devices in distribution layer 912 operate as a virtual network device 1002. Similarly, two or more of network devices 924(1)-924(n) operate as a single virtual network device 1004, and two or more of network devices 926(1)-926(n) operate as a single virtual network device 1006. More details of how two distribution-layer network devices collectively operate as a distribution-layer virtual network device 1002 are shown in FIGS. 10A, 10B, and 11. Virtual network devices can be coupled to other virtual network devices, to network devices, and/or to clients and/or servers by virtual link bundles, as described below. In general, any multi-ported device (whether a physical device, such as a network device, client, or server, or a virtual network device) can be coupled to a virtual network device by a virtual link bundle that includes several links, some of which terminate on different sub-units within the virtual network device.

FIG. 10A shows an example of a network in which there are two network devices 920(1) and 920(2) in access layer 910. There are also two network devices 922(1) and 922(2) in distribution layer 912. These two network devices 922(1) and 922(2) operate as a single virtual network device 1002 in this example. Each network device 920(1)-920(2) is coupled to distribution layer 912 by two links. In this example, each of those two links is coupled to a different one of network devices 922(1) and 922(2). This provides redundancy, allowing network devices 920(1) and 920(2) to continue to communicate with distribution layer 912 even if one of network devices 922(1) or 922(2) fails or if one of the links between a given access-layer network device and a given distribution-layer network device fails.

The redundant links coupling each of network devices 920(1) and 920(2) to virtual network device 1002 can be operated as a single logical link, referred to herein as a virtual link bundle. Network device 920(1) operates the two links coupling network device 920(1) to virtual network device 1002 as a virtual link bundle 1050(1). In such an embodiment, each interface in network device 920(1) that is coupled to one of the links is included in an interface bundle, which corresponds to virtual link bundle 1050(1). Network device 920(2) similarly operates the two links coupling network device 920(2) to virtual network device 1002 as virtual link bundle 1050(2). In some embodiments, virtual link bundles 1050(1) and 1050(2) are each operated as an EtherChannel™ or as an aggregated link (as described in IEEE 802.3).

As shown in FIG. 10A, each virtual link bundle 1050(1) and 1050(2) includes links that terminate at different network devices in distribution layer 912. For example, virtual link bundle 1050(1) couples network device 920(1) to both network device 922(1) and network device 922(2). This differs from conventional implementations in which logical links are only allowed between a single pair of network devices.

In some embodiments, network devices 920(1) and 920(2) are aware (e.g., through various state information maintained within each network device) that each virtual link bundle 1050(1) and 1050(2) includes links that are terminated on different network devices in distribution layer 912. In such an embodiment, network devices 920(1) and 920(2) can select a link within a particular virtual link bundle on which to send a packet based on this awareness.

In other embodiments, network devices 922(1) and 922(2) operate to conceal the fact that such a single logical link actually includes links that are terminated at different network devices. For example, as shown in FIG. 10A, network devices 922(1) and 922(2) operate as a single virtual network device 1002. FIG. 10B illustrates how, from the perspective of network device 920(1) in access layer 910, network device 920(1) is coupled to a single network device, virtual network device 1002, in distribution layer 912 by a redundant pair of links. Network device 920(2) has a similar perspective of virtual network device 1002.

In embodiments, such as the one shown in FIG. 10B, in which network devices 920(1) and 920(2) see themselves as being connected to a single network device, the use of a virtual link bundle is simplified. For example, if network device 920(1) is aware that virtual link bundle 1050(1) terminates at two different network devices, network device 920(1) selects a link on which to send a particular packet based on Spanning Tree Protocol. The use of Spanning Tree Protocol may involve more overhead and/or be more restrictive with respect to which links can be used to send a given packet (e.g., Spanning Tree Protocol might block all but one of the links, preventing utilization of all but one non-blocked link) than if network device 920(1) simply views virtual network device 1002 as a single entity. When viewing virtual network device 1002 as a single entity, for example, network device 920(1) simply select a link on which to send a packet based on load-sharing constraints. Similarly, if a link within virtual link bundle 1050(1) fails, there is no need for network device 920(1) to change how Spanning Tree Protocol is applied. Instead, network device 920(1) simply continues to use the non-failed links within virtual link bundle 1050(1).

The individual network devices, such as network device 922(1) and 922(2), included in virtual network device 1002 are each referred to herein as a "virtual network device sub-unit". In some embodiments, virtual network device sub-units 922(1) and 922(2) are each implemented in a separate chassis (i.e., each chassis houses a single virtual network device sub-unit). For example, in FIG. 10A, network devices 922(1) and 922(2) can each be implemented in a separate chassis. Even if virtual network device sub-units 922(1) and 922(2) share a chassis, each virtual network device sub-unit can be made to operate as an independent network device, allowing one virtual network device sub-unit to continue operating if the other virtual network device sub-unit(s) in the virtual network device fail. For example, virtual network device sub-unit 922(1) and virtual network device sub-unit 922(2) can be in the same chassis, but each virtual network device sub-unit can have independent hardware, ports, uplink interfaces, and power supplies, and each can be removed from the chassis independently of the other. If virtual network device sub-unit 922(1) fails (e.g., due to a power supply failure or a software error), virtual network device sub-unit 922(2) can continue to run. In such an embodiment, virtual network device sub-unit 922(1) can be removed for repair or replacement without disrupting the operation of virtual network device sub-unit 922(2).

In some embodiments, the links in a virtual link bundle coupling a network device to an adjunct network device are specialized links, referred to herein as uplinks, that are used to couple an adjunct network device to a virtual network device. Each uplink can convey both a packet and additional information generated within one of the network devices. For example, in one embodiment, if a packet is being conveyed on an uplink from an access-layer adjunct network device to a distribution-layer network device, additional information conveyed on the uplink with the packet includes information identifying which of the adjunct network device's ports received the packet. The additional information also includes information indicating whether any forwarding or routing has already been performed on the packet by the sending device. In some embodiments, use of uplinks allows a virtual network device to control adjunct network devices that are coupled to that virtual network device. The use of uplinks also facilitates the virtual network device being able to perform routing and/or forwarding for subordinate adjunct network devices. An interface within a network device or adjunct network device that is coupled to an uplink is referred to herein as an uplink interface.

FIG. 11 shows more detail within each network device included in a virtual network device. Here, virtual network device 1002 includes two virtual network device sub-units 922(1) and 922(2). It is noted that in other embodiments, virtual network device 1002 includes more than two component network devices. In this example, virtual network device 1002 is located at the distribution layer of the network. However, similar virtual network devices can be implemented in other network layers (e.g., within the data center and/or core layer).

Virtual network device 1002 is coupled to several access-layer network devices 920(1)-920(3). Network devices 920(2) and 920(3) are each coupled to virtual network device 1002 by two uplinks, one to each virtual network device sub-unit 922(1) and 922(2). Network device 920(2) is coupled to virtual network device by virtual link bundle 1050(2), and network device 920(3) is coupled to virtual network device 1002 by virtual link bundle 1050(3). As a result, network devices 920(2) and 920(3) continues to communicate with the distribution layer even if one of these uplinks and/or one of virtual network device sub-units 922(1) and 922(2) fail. Network device 920(1) is coupled to virtual network device 1002 by three uplinks: two uplinks to virtual network device sub-unit 922(1) and one uplink to virtual network device sub-unit 922(2). These three uplinks collectively form virtual link bundle 1050(1). Network device 920(1) continues to communicate with the distribution layer even if two of the three uplinks and/or one of virtual network device sub-units 922(1) and 922(2) fail. Network devices 920(1)-920(3) each operate multiple uplinks to virtual network device 1002 as a single logical uplink. Additionally, in some embodiments, each network device 920(1)-920(3) operates as if that network device is coupled to a single distribution-layer device, virtual network device 1002, instead of operating as if that network device were coupled to two independent distribution-layer network devices.

Distribution-layer virtual network device sub-unit 922(1) is also coupled to a server 904(3) by a single link. Unlike access-layer network devices 920(1)-920(3), server 904(3) does not view distribution-layer network devices units 922(1) and 922(2) as a single logical network device. In this example, server 904(3) will be unable to communicate via the distribution layer if either network device 922(1) or the link coupling server 904(3) to network device 922(1) fails. It is noted that in alternative embodiments, a server such as server 904(3) but having multiple ports could be coupled to each virtual network device sub-unit by a virtual link bundle, and that such a server could interact with virtual network device sub-units 922(1) and 922(2) as if those sub-units were a single virtual network device 1002.

Virtual network device sub-unit 922(1) includes several cards, including control card 1102(1) and line cards 1104(1) and 1104(3). Similarly, virtual network device sub-unit 922(2) includes control card 1102(2) and line cards 1104(2) and 1104(4). Control card 1102(1) includes control unit 1110(1), forwarding engine 1112(1), and interfaces 1120(1) and 1120(3). Control card 1102(2) likewise includes control unit 1110(2), forwarding engine 1112(2), and interfaces 1120(2) and 1120(4).

In virtual network device sub-unit 922(1), line card 1104(1) includes forwarding engine 1114(1) and interfaces 1120(5), 1120(7), and 1120(9). Interface 1120(7) is coupled to network device 920(3). Interface 1120(9) is also coupled to network device 920(1). Interface 1120(5) is unused in this example. Line card 1104(3) includes forwarding engine 1114(3), interfaces 1120(11) and 1120(13), and port 1120(15). Interfaces 1120(11) and 1120(13) are respectively coupled to network devices 920(2) and 920(1). Interface 1120(15) is coupled to server 904(3). In embodiments in which network devices 920(1)-920(3) are adjunct network devices controlled by virtual network device 1002, interfaces 1120(7), 1120(9), 1120(11), and 1120(13) are operated as uplink interfaces, while interface 1120(15), which is not coupled to an adjunct network device, is operated as a normal port.

In virtual network device sub-unit 922(2), line card 1104(2) includes forwarding engine 1114(2) and interfaces 1120(6), 1120(8), and 1120(10). Interface 1120(8) is coupled to adjunct network device 920(2), and interfaces 1120(6) and 1120(10) are unconnected. Line card 1104(4) includes forwarding engine 1114(4) and interfaces 1120(12), 1120(14), and 1120(16). Interfaces 1120(12) and 1120(16) are respectively coupled to adjunct network devices 920(3) and 920(1). Interface 1120(14) is unused. In embodiments in which network devices 920(1)-920(3) are adjunct network devices controlled by virtual network device 1002, interfaces 1120(8), 1120(12), and 1120(16) are operated as uplink interfaces, Note that while the interfaces in FIG. 11 have been described as both ingress and egress interfaces, interfaces that act as ingress-only or egress-only interfaces can also be used. For example, the functionality of each of the interfaces shown in FIG. 11 can be implemented using one ingress-only interface and one egress-only interface. Similarly, virtual link bundles 1050(1)-1050(3) can each include several links that only convey packets from a respective network device 920(1)-920(3) to virtual network device 1002 and several links that only convey packets from virtual network device 1002 to a respective network device 920(1)-920(3).

In the illustrated embodiment, control card 1102(1) in virtual network device sub-unit 922(1) is coupled to control card 1102(2) in virtual network device sub-unit 922(2) via a virtual network device link 1160. In this example, virtual network device link 1160 includes two links (two links are used to provide increased fault-tolerance and/or bandwidth; however, one link can be used in other embodiments). These links are a type of uplink in this example, carrying information (e.g., such as headers similar to those sent between line cards) in addition to packets. The uplinks in virtual network device link 1160 are used to exchange information, which controls the operation of virtual network device 1002, as well as packets between virtual network device sub-units 922(1) and 922 (2). By communicating via these uplinks, virtual network device sub-units 922(1) and 922(2) coordinate their behavior such that virtual network device sub-units 922(1) and 922(2) appear to be a single virtual network device to network devices 920(1)-920(3).

Thus, providing interconnections between virtual network device sub-units 922(1) and 922(2) allows virtual network device sub-units 922(1) and 922(2) to operate as a single virtual network device 1002. Network devices 920(1)-920(3) communicate with virtual network device 1002 in the same way that network devices 920(1)-920(3) would communicate with a single physical device. For example, if network device 920(2) is handling a packet addressed to server 904(3), network device 920(2) selects one of the two uplinks in network device bundle 1050(2) on which to send the packet. This selection is based on load-sharing criteria in some embodiments. In such a situation, since virtual network device 1002 appears to be a single network device, network device 920(2) is just as likely to select the uplink to virtual network device sub-unit 922(2) as the uplink to virtual network device sub-unit 922(1), despite the fact that only virtual network device sub-unit 922(1) has a direct connection to server 904(3). If the packet is sent to virtual network device sub-unit 922(2), network device 922(2) uses one of the uplinks included in virtual network device link 1160 between virtual network device sub-units 922(1) and 922(2) to send the packet to virtual network device sub-unit 922(1), and virtual network device sub-unit 922(1) can in turn provide the packet to the packet's destination, server 904(3).

In other embodiments, network devices 920(1)-920(3) are aware that virtual link bundles 1050(1) and 1050(2) actually terminate on two different network devices. Network devices 920(1)-920(3) control packet transmission based on this information. For example, in this situation, network device 920(2) handles a packet addressed to server 904(3) by selecting the uplink coupled to virtual network device sub-unit 922(1) instead of the uplink coupled to virtual network device sub-unit 922(2), based on the fact that network device 920(2) recognizes separate connections to two different network devices within the logical link.

Interfaces 1120(13), 1120(9), and 1120(16), which are each coupled to network device 920(1) by virtual link bundle 1050(1), form an interface bundle (e.g., an EtherChannel™ port bundle). Similarly, interfaces 1120(11) and 1120(8) form another interface bundle that is coupled to network device 920(2) by virtual link bundle 1050(2). Interfaces 1120(7) and 1120(12) form a third interface bundle that is coupled to network device 920(3) by virtual link bundle 1050(3). Within virtual network device 1002, each interface in the same interface bundle is assigned the same logical identifier. For example, interfaces 1120(13), 1120(9), and 1120(16) are each assigned the same logical identifier. In some embodiments, packets received via one of these interfaces are tagged or otherwise associated with the logical identifier to indicate that those packets were received via the virtual link bundle coupling virtual network device 1002 to network device 920 (1). It is noted that similar interface bundles are implemented within each network device 920(1)-920(3), and that interfaces included in such bundles are also assigned the same logical identifier by each network device (or by virtual network device 1002, in embodiments in which virtual network device 1002 controls the configuration of the network devices 920(1)-920(3)). For example, network device 920(1) can assign the same logical identifier to each of the interfaces coupled to virtual link bundle 1050(1).

The association between a packet and a particular logical identifier is used by forwarding engines within virtual network device 1002 to route and forward packets to and from network devices 920(1)-920(3). For example, when a packet from a sending device (e.g., a client coupled to network device 920(1)) is received via uplink interface 1120(13), virtual network device sub-unit 922(1) learns that the sending device's MAC address is "behind" uplink interface 1120(13) by associating the MAC address with the logical identifier of uplink interface 1120(13). Virtual network device sub-unit 922(1) informs each forwarding engine in virtual network device sub-unit 922(1) as well as each forwarding engine in virtual network device sub-unit 922(2) of this association. Based on the association, packets addressed to that MAC address will be sent from an uplink interface having the associated logical identifier. Since in this case, uplink interfaces 1120(9) (in virtual network device sub-unit 922(1)) and 1120(16) (in virtual network device sub-unit 922(2)) also have the same logical identifier as uplink interface 1120(13), a packet addressed to that MAC address can be forwarded via any of uplink interfaces 1120(9), 1120(13), and 1120(16).

The same logical identifiers are used to identify uplink interface bundles by each of virtual network device sub-units 922(1) and 922(2), and the virtual network device sub-units coordinate to assign the same logical identifier to each uplink interface within the same uplink interface bundle. When forwarding packets via an uplink interface bundle identified by a particular logical identifier, each virtual network device sub-unit 922(1) and 922(2) generates a hash value to select one of the uplink interfaces within that uplink interface bundle on which to send the packet. Each of the virtual network device sub-units uses these hash values to identify local uplink interfaces within that virtual network. Thus, each virtual network device sub-unit will only select an uplink interface that is local to that virtual network device sub-unit. For example, if virtual network device sub-unit 922(1) is forwarding a packet via the uplink interface bundle that includes interfaces 1120 (9), 1120(13), and 1120(16), the hash value generated by virtual network device sub-unit will identify one of interfaces 1120(9) or 1120(13).

In the above example, by associating each hash value with local uplink interfaces in the uplink interface bundle, the usage of virtual switch link 1160 is reduced. Essentially, virtual network device sub-unit 922(1) favors local uplink interfaces within a particular uplink interface bundle over remote uplink interfaces, in the same uplink interface bundle, on virtual network device sub-unit 922(2). Likewise, virtual network device sub-unit 922(2) favors local uplink interfaces within a particular uplink interface bundle over uplink interfaces included in virtual network device sub-unit 922(1). For example, if virtual network device sub-unit 922(2) needs to forward a packet via an uplink interface, virtual network device sub-unit 922(2) will send that packet via uplink interface 1120(12) instead of forwarding that packet across virtual network device link 1160 to be sent via uplink interface 1120(7). By favoring local interfaces, the amount of traffic sent over virtual network device link 1160 is reduced, since each virtual network device sub-unit 922(1) and 922(2) will forward locally-received packets (i.e., packets received via interfaces other than those coupled to virtual network device link 1160) from a local interface.

In some embodiments, for a given virtual link bundle, that virtual link bundle is managed (e.g., with respect to control protocols such as L2 protocols) in a central location. For example, all of the control protocol processing for virtual link bundle 1050(1) can take place in control unit 1110(1) of virtual network device sub-unit 922(1). The results of this control protocol processing are then communicated to control unit 1110(2) of virtual network device sub-unit 922(2) and/or to a controller in network device 920(1). Control unit 1110(2) then uses (but not modify) this information when controlling how packets sent from and received via uplink interface 1120 (16) (which is in the uplink interface bundle coupled to virtual link bundle 1050(1)) are handled. For example, control unit 1110(2) uses this information to set up or modify lookup tables on line cards 1104(2) and/or 1104(4). In this way, the actual control protocol processing is centralized in control unit 1110(1), as opposed to being distributed among several control units in virtual network device 1002.

The central point of control protocol processing can vary among virtual link bundles. For example, while control protocol processing for virtual link bundle 1050(1) is managed by control unit 1110(1), control protocol processing for virtual link bundle 1050(2) can be managed by control unit 1110(2). In other words, control unit 1110(2) can perform all of the control processing for virtual link bundle 1050(2), and the information generated by control unit 1110(2) can then be communicated to control unit 1110(1) for use (but not modification) within virtual network device sub-unit 922(1).

In embodiments that implement a central point of management within virtual network device 1002 for each virtual link bundle's control protocol processing, L2 protocols can be run across the virtual link bundle and/or interface bundles can be used as routed L3 interfaces. These abilities would not be available if the virtual network device sub-units within virtual network device 1002 each performed control protocol processing for local interfaces independently of each other. Additionally, in embodiments implementing a central point of control protocol processing, a user can modify the virtual link bundle's control protocol behavior by accessing a single virtual network device sub-unit. In the above example, when updating control protocol behavior of virtual link bundle 1050(1), a user can simply access virtual network device sub-unit 922(1) (instead of accessing both virtual network device sub-units 922(1) and 922(2)). Virtual network device sub-unit 922(1) then automatically propagate to network device 922(2) any changes made by the user to the control protocols. Furthermore, since the use of virtual link bundles allows several uplinks to be managed as a single logical uplink, fewer uplink interfaces need to be configured than would be required if virtual link bundles were not used. For example, if each virtual link bundle includes two uplinks, the number of uplink interfaces within virtual network device 1002 that need to be configured by a user is halved.

Virtual network device sub-units 922(1) and 922(2) implement certain behaviors in order to act as a virtual network device 1002 that, from the perspective of network devices 920(1)-920(3), appears to be a single logical network device. For example, whenever virtual network device sub-unit 922 (2) receives a packet from a local network device, client, or server and that packet's destination logical identifier identifies an uplink interface bundle, virtual network device sub-unit 922(2) sends the packet from a local uplink interface within the identified uplink interface bundle. Virtual network device sub-unit 922(2) can also provide the packet to virtual network device sub-unit 922(1), but virtual network device sub-unit 922(1) should not output this packet on a virtual link bundle. This way, the destination device only receives one copy of the packet from virtual network device 1002 (as opposed to receiving one copy from each virtual network device sub-unit 922(1) and 922(2)) and the appearance of virtual network device 1002 being a single entity is maintained.

To operate in this way, each egress uplink interface coupled to a link in a virtual link bundle is configured to filter out traffic received via virtual network device link 1160. For example, a packet is received at virtual network device sub-unit 922(1) via virtual network device link 1160. The interface 1120(1) or 1120(3) that receives the packet updates information (e.g., in a header) associated with the packet to indicate that the packet was received via virtual network device link 1160 (in alternative embodiments, the sending interface in virtual network device sub-unit 922(2) can update this information). When virtual network device sub-unit 922 (1) looks up the destination address of the packet in a lookup table, the lookup table returns the logical identifier that identifies local uplink interfaces 1120(9) and 1120(13). The packet is then forwarded to uplink interface 1120(13) (e.g., selected based on load-sharing considerations). When uplink interface 1120(13) receives the packet, uplink interface 1120 (13) will only output the packet if the packet was not received via virtual switch link 1160, since if the packet was received via the virtual switch link, the other virtual network device sub-unit 922(2) will have already sent the packet via the virtual link bundle. Thus, uplink interface 1120(13) can filter the packet from the packet flow being sent via uplink interface 1120(13) based on the information appended to the packet that indicates whether the packet was received via virtual network device link 1160.

In some embodiments, MAC notification frames are used to keep the content of the L2 tables in virtual network device sub-unit 922(1) synchronized with the content of the L2 tables in virtual network device sub-unit 922(2) and vice versa. Whenever a MAC notification that involves a port behind a virtual link bundle or an uplink interface included in an uplink interface bundle is generated within a virtual network device sub-unit (e.g., such a notification can be generated by one line card in order to update an L2 table on another line card), a copy of the MAC notification is sent via to virtual network device link 1160. Similarly, if a virtual network device sub-unit determines that a packet should be flooded, the virtual network device sub-unit will send a copy of that packet via virtual network device link 1160, ensuring that the virtual network device sub-unit will receive a copy of any MAC notification response generated by a forwarding engine in the peer virtual network device sub-unit.

By way of example, assume that virtual network device sub-unit 922(1) floods a packet because the forwarding engine(s) included in virtual network device sub-unit 922(1) do not know which port or uplink interface is associated with the packet's destination address. As part of flooding the packet, virtual network device sub-unit 922(1) sends a copy of the packet to virtual network device sub-unit 922(2) via virtual switch link 1160. If a forwarding engine within virtual network device sub-unit 922(2) already knows that the destination address is behind a particular uplink interface or port (e.g., if a forwarding table already includes an entry associating the destination address with a port of one of network devices 920), that forwarding engine generates a MAC notification identifying this association, which is distributed to any other forwarding engines within virtual network device sub-unit 922(2). Since the packet was originally received via virtual network device link 1160, virtual network device sub-unit 922(2) also sends a copy of the MAC notification back via virtual network device link 1160. This MAC notification is then distributed among the forwarding engines included in virtual network device sub-unit 922(1). After being updated based on the MAC notification, the forwarding engines in virtual network device sub-unit 922(1) now know the location of the device identified by the destination address. Accordingly, subsequently-received packets addressed to that device are not flooded.

When all of the physical links in a virtual link bundle that connect to a single virtual network device sub-unit fail, the virtual link bundle transitions to a normal link bundle that is coupled to a single virtual network device sub-unit. At this point, the behavior of each virtual network device sub-unit with respect to that network device bundle is modified. For example, assume that all of the uplinks in virtual link bundle 1050(1) that are coupled to virtual network device sub-unit 922(2) fail. At this point, virtual network device sub-unit 922(2) no longer has any local uplink interfaces that can send packets via virtual link bundle 1050(1). Accordingly, virtual network device sub-unit 922(2) will redirect all traffic that needs to be sent via virtual link bundle 1050(1) across virtual network device link 1160. Additionally, since network device 922(2) can no longer send packets via virtual link bundle 1050(1), virtual network device sub-unit 922(1) will cease to filter traffic received via virtual network device link 1160 from being sent via virtual link bundle 1050(1). If at least one of the uplinks in virtual link bundle 1050(1) that is coupled to virtual network device sub-unit 922(2) is restored, virtual link bundle 1050(1) will transition back to the normal mode of operation, in which virtual network device sub-unit 922(2) will send locally-received packets via virtual link bundle 1050(1) and virtual network device sub-unit 922(1) will filter packets received via virtual network device link 1160 from being sent virtual link bundle 1050(1).

Both virtual network device link 1160, which couples virtual network device sub-units 922(1) and 922(2) together to form virtual network device 1002, and the uplinks that are included in virtual link bundles 1050(1)-1050(3), which couple network devices 920(1)-920(3) to virtual network device 1002, are examples of links upon which supplemental headers are conveyed. For example, virtual network device link 1160 is operated in a special mode in which each packet conveyed via virtual network device link 1160 is appended with a supplemental header that carries control information. This control information can identify which interface or interface bundle originally received the packet to which the supplemental header is appended. The control information can also identify the result of a forwarding lookup performed by one of the virtual network device sub-units. For example, if virtual network device sub-unit 922(1) receives a packet via interface 1120(9), forwarding engine 1114(1) (which is part of the same line card, line card 1104(1), as interface 1120(9)) can perform a forwarding lookup for the packet. Line card 1104(1) can append a supplemental header to the packet. The supplemental header includes information identifying the interface bundle that includes interface 1120(9) as well as information identifying the result of the forwarding lookup. The packet and supplemental header are forwarded to control card 1102(1), which can in turn forward the packet and supplemental header to virtual network device sub-unit 922(2) via virtual network device link 1160.

Supplemental headers are also conveyed on the uplinks that couple virtual network device 1002 to network devices 920(1)-920(3). In one embodiment, the same protocol, used to define the supplemental headers used on virtual network device link 1160, is used to define the supplemental headers conveyed on the uplinks. In other embodiments, a different protocol defines the supplemental headers used on each type of link. Supplemental headers conveyed on uplinks can include information identifying an interface on one of network devices 920(1)-920(3), as well as the result of a forwarding lookup (if any) performed by one of network devices 920(1)-920(3). For example, network device 920(1) receives a packet via an interface I1 (not shown). In response, network device 920(1) appends a supplemental header to the packet. The supplemental header identifies interface I1. Network device 920(1) then sends the packet and the appended supplemental header to virtual network device 1002 via one of the uplinks in virtual link bundle 1050(1).

Interfaces 1120(1)-1120(4) can each perform the methods shown in FIGS. 6 and 7 in order to verify that each interface is coupled to an interface that supports supplemental headers. This may in turn indicate whether any configuration errors have occurred and/or prevent forwarding errors from occurring (e.g., such as forwarding errors that could arise due to misinterpreting a non-supplemental header as a supplemental header). For example, interface 1120(1) may accidentally be coupled to interface 1120(6). In this example, interface 1120(6) does not support the protocol that defines the supplemental headers sent across virtual network device link 1160 (e.g., in one embodiment, only interfaces included on control cards 1102(1) and 1102(2) support this protocol). By performing the method of FIG. 6, interface 1120(1) can detect that interface 1120(6) does not support the protocol that defines the supplemental headers used on virtual network device link 1160. As a result, interface 1120(1) will not mistakenly interpret a non-supplemental header sent by interface 1120(6) as a supplemental header.

Interfaces 1120(1)-1120(4) can also use the methods of FIGS. 6 and 7 to verify that no configuration errors, such as loopback errors, have occurred. For example, a loopback error can occur if a user accidentally couples interface 1120(1) to interface 1120(3) (both of these interfaces are included in the same virtual network device sub-unit). Interface 1120(1) can perform the method of FIG. 6 to detect this loopback error.

Although the present invention has been described with respect to specific embodiments thereof, various changes and modifications may be suggested to one skilled in the art. It is intended such changes and modifications fall within the scope of the appended claims.

What is claimed is:

1. A method comprising:
   detecting a first value within a preamble generated by a sending device, wherein the first value indicates whether the preamble is an information-carrying preamble;
   detecting a second value within the preamble; and
   verifying that a header generated by the sending device is a supplemental header, in response to the detecting the second value within the preamble, wherein the preamble is sent by the sending device prior to the header.

2. The method of claim 1, wherein
   the preamble precedes an Ethernet packet.

3. The method of claim 1, wherein
   the preamble is a converged data link (CDL) preamble.

4. The method of claim 1, wherein
   the preamble comprises operation, administration and management (OAM) information.

5. The method of claim 1, wherein the detecting the second value within the preamble comprises:
   detecting at least a portion of a token within the preamble.

6. The method of claim 1, wherein
   the verifying is performed subsequent to detecting an Nth token within an Nth preamble generated by the sending device.

7. The method of claim 6, wherein detecting the Nth token comprises:
   detecting a change in value of a field in each of N consecutively-received preambles.

8. The method of claim 6, further comprising:
   extracting information from an N+1th preamble generated by the sending device in response to the verifying; and
   detecting a configuration error in response to the information.

9. The method of claim 8, wherein
the information comprises a device identifier; and
the configuration error is a loopback error.

10. A method comprising:
detecting a value within a preamble generated by a sending device;
verifying that a header generated by the sending device is a supplemental header, in response to the detecting the value within the preamble, wherein
the preamble is sent by the sending device prior to the header,
the verifying is performed subsequent to detecting an Nth token within an Nth preamble generated by the sending device,
the detecting and the verifying are performed by a virtual network device sub-unit;
extracting information from an N+1th preamble generated by the sending device in response to the verifying, wherein
the information comprises a device identifier; and
detecting a configuration error in response to the information, wherein
the configuration error is a loopback error.

11. The method of claim 1, further comprising:
sending to the sending device one or more supplemental headers, in response to the verifying.

12. A method comprising:
sending a preamble, the preamble comprising a first value and a second value, wherein
the first value indicates whether the preamble is an information-carrying preamble, and
the second value identifies that a header is a supplemental header; and
sending the header, subsequent to the sending the preamble.

13. The method of claim 12, wherein
the preamble precedes an Ethernet packet.

14. The method of claim 12, wherein
the preamble is a converged data link (CDL) preamble.

15. The method of claim 12, further comprising:
sending a plurality of preambles, wherein
each of the preambles includes a respective token.

16. The method of claim 15, further comprising:
sending an additional preamble subsequent to the sending the plurality of preambles, wherein
the additional preamble comprises a device identifier.

17. The method of claim 12, wherein
the preamble comprises operation, administration and management (OAM) information.

18. A system comprising:
a first network device; and
a second network device coupled to the first network device, wherein the second network device is configured to:
detect a first value within a preamble, wherein
the first value indicates whether the preamble is an information-carrying preamble,
detect a second value within the preamble, and
verify that a header is a supplemental header, in response to detecting the second value within the preamble, wherein the preamble and the header are generated by the first network device.

19. The system of claim 18, wherein the first network device is configured to:
detect the second value within a second preamble, the second preamble generated by the second network device; and
verify that a second header is a second supplemental header, in response to detecting the second value within the second preamble, wherein the second header is generated by the second network device.

20. An apparatus comprising:
an interface configured to receive a first preamble, the interface comprising a supplemental header verification module and a preamble verification module,
wherein the supplemental header verification module is configured to detect a first value and a second value within the first preamble, in response to the preamble verification module detecting, based upon the first value, that the first preamble is an information-carrying preamble, and
the supplemental header verification module is configured to identify that a first header is a supplemental header, in response to detecting the second value within the first preamble.

21. The apparatus of claim 20, wherein the interface further comprises a configuration error detection module configured to detect a loopback error in response to detecting an identifier within the first preamble.

22. The apparatus of claim 20, wherein
the interface further comprises a preamble generation module, and
the preamble generation module is configured to include the second value in a new preamble.

23. The apparatus of claim 22, wherein
the preamble generation module is configured to include a respective one of N values in each of N preambles.

24. An apparatus comprising:
an interface, wherein
the interface comprises a preamble generation module,
the preamble generation module is configured to include a first value and a second value in a preamble,
the first value indicates whether the preamble is an information-carrying preamble, and
the second value indicates that a header is a supplemental header.

25. The apparatus of claim 24, wherein
the preamble is a converged data link (CDL) preamble.

26. The apparatus of claim 24, wherein
the preamble generation module is configured to include a respective one of N values in each of N preambles.

27. The apparatus of claim 24, wherein
the preamble generation module is configured to include a device identifier in an additional preamble.

28. A system comprising:
means for detecting a first value within a preamble generated by a sending device, wherein
the first value indicates whether the preamble is an information-carrying preamble;
means for detecting a second value within the preamble; and
means for verifying that a header generated by the sending device is a supplemental header, in response to detection of the second value within the preamble, wherein the preamble is sent by the sending device prior to the header.

29. A system comprising:
means for sending a preamble, the preamble comprising a first value and a second value, wherein
the first value indicates whether the preamble is an information-carrying preamble, and
the second value identifies that a header is a supplemental header; and means for sending the header, subsequent to the sending the preamble.

* * * * *